US005690186A

United States Patent [19]

Sugioka et al.

[11] Patent Number: 5,690,186
[45] Date of Patent: Nov. 25, 1997

[54] CONTROL APPARATUS AND METHOD FOR ELECTRIC VEHICLES

[75] Inventors: Kouichi Sugioka; Hiroyuki Sinmura; Masao Ogawa; Satoshi Honda; Yoshihiro Nakazawa; Takaaki Fujii, all of Saitama, Japan

[73] Assignee: Honda Giken Kogyo Kabushiki Kaisha, Tokyo, Japan

[21] Appl. No.: 714,267

[22] Filed: Sep. 17, 1996

Related U.S. Application Data

[62] Division of Ser. No. 151,172, Nov. 12, 1993, Pat. No. 5,610,814.

[30] Foreign Application Priority Data

Nov. 12, 1992 [JP] Japan ................................. 4-327368
Sep. 29, 1993 [JP] Japan ................................. 5-243049

[51] Int. Cl.$^6$ ................................................ B60K 28/00
[52] U.S. Cl. ................. 180/273; 296/37.15; 297/195.1; 364/424.06; 340/438
[58] Field of Search ................................. 180/273, 219, 180/220; 286/37.15; 297/195.1; 364/424.06; 340/438

[56] References Cited

U.S. PATENT DOCUMENTS

| | | |
|---|---|---|
| 1,748,705 | 2/1930 | Dodson . |
| 3,927,776 | 12/1975 | Steiger ................. 180/273 X |
| 4,198,092 | 4/1980 | Federspiel . |
| 4,256,340 | 3/1981 | Dunchock ............. 296/37.15 |
| 4,369,745 | 1/1983 | Howard . |
| 4,389,154 | 6/1983 | Minor et al. ........... 180/273 X |
| 4,555,651 | 11/1985 | Melocik et al. . |
| 4,580,081 | 4/1986 | Krueger et al. . |
| 4,607,199 | 8/1986 | Krueger et al. . |
| 4,683,373 | 7/1987 | Tupman . |
| 4,691,148 | 9/1987 | Nicholls et al. . |
| 5,040,632 | 8/1991 | Fujii et al. ............ 180/219 |
| 5,044,646 | 9/1991 | Iiga et al. ............ 180/219 |
| 5,109,945 | 5/1992 | Koga . |
| 5,156,232 | 10/1992 | Muroya et al. . |
| 5,313,191 | 5/1994 | Yamashita et al. . |

FOREIGN PATENT DOCUMENTS

| | | |
|---|---|---|
| 2567185 | 1/1986 | France . |
| 2636036 | 3/1990 | France . |
| 2669585 | 10/1991 | France . |
| 542566 | 1/1932 | Germany . |
| 2184990 | 7/1987 | United Kingdom . |
| 2224601 | 5/1990 | United Kingdom . |
| 2233703 | 1/1991 | United Kingdom . |

*Primary Examiner*—Christopher P. Ellis

[57] ABSTRACT

A control apparatus of an electric vehicle for effectively limiting the operation of the vehicle when it is determined that a driver of the electric vehicle is not sitting in the seat and an accelerator opening of the electric vehicle is in a position corresponding to a minimum value. A motor driving enablement circuit generates a motor driving command which selectively limits operation of the electric vehicle in accordance with these determinations. In addition, when a state in which the driver is not occupying the seat continues for a period of time exceeding a predetermined value, a motor halt controller issues a motor halt command for halting a motor of the electric vehicle. Based on the motor driving enablement command and the motor halt command, a power supply controller controls the supply of power to the motor of the electric vehicle.

1 Claim, 16 Drawing Sheets

CONTROL APPARATUS AND METHOD FOR ELECTRIC VEHICLES

This application is a divisional of application Ser. No. 08/151,172, filed on Nov. 12, 1993, now U.S. Pat. No. 5,610,814 the entire contents of which are hereby incorporated by reference.

BACKGROUND OF THE INVENTION

1. Field of the Invention

The present invention relates to a control apparatus for an electric vehicle.

2. Description of the Background Art

In a conventional electric vehicle, when the power supply switch is turned on and the accelerator is operated, a large current flows instantaneously creating a thermal effect which effects various parts of the electric vehicle including the electric motor coil. In order to eliminate such a thermal effect, technologies for developing apparatuses have been proposed for controlling starting operations of the electric vehicle, such as halting the current supplied to the motor by turning off a main relay.

However, technologies related to apparatuses for controlling operations of the conventional electric vehicle are not necessarily devised for vehicles such as electric motor driven bicycles. The conventional apparatus for controlling starting operations for electric vehicles has a problem in that it cannot be used for all applications.

In the case of an electric motor bicycle, for example, the accelerator can also be operated even if the driver is not sitting on the seat. In this case, it is desirable to control the operation of the electric motor bicycle.

As for the conventional electric vehicle, for instance, a power supply ON verifying alarm is sounded to attract the driver's attention that the electric vehicle is ready for operation. In order to produce such an alarm sound, the conventional electric vehicle is equipped with a special electroacoustic transducer such as a piezoelectric horn. The piezoelectric horn is used because an electromagnetic horn serving as a klaxon or the like generates too loud of a sound and cannot produce sound having a frequency different from an intrinsic vibration frequency due to the fact that the electromagnetic horn serving as a klaxon is driven by a dc voltage which is turned on and off by an embedded self-intermittent mechanism in order to allow the dc voltage to be applied directly to the electromagnetic horn. As a result, two kinds of electroacoustic transducers are unavoidably needed. Nevertheless, it is desirable to use a common single transducer if possible.

SUMMARY OF THE INVENTION

It is a first object of the present invention to solve the above problems by providing a control apparatus for limiting the operation of electric vehicles including electric motor bicycles so as to allow the motor to be driven only when the driver is sitting on the seat correctly.

It is a second object of the present invention to provide electric vehicles with a control apparatus for limiting operations when the driver is not sitting on the driver's seat.

It is a third object of the present invention to provide electric vehicles with a control apparatus for, if necessary, removing the limitation on the motor operation of the electric vehicles imposed by the control apparatus provided as the second object.

It is a fourth object of the present invention to provide electric vehicles with a control apparatus for indicating that the power supply switch is turned on after the limitation on the motor operation has been removed, for electric power saving purposes.

It is a fifth object of the present invention to provide electric vehicles with a control apparatus for allowing a common single electroacoustic transducer to be shared as a multi-purpose audible unit.

The objects of the present invention are fulfilled in a first embodiment by providing a control apparatus for an electric vehicle including a seat detector for verifying that a driver is sitting on the vehicle seat; an accelerator opening detector for detecting the opening of an accelerator; a motor driving enablement circuit for generating a motor driving enablement command when the seat detector produces a detection output indicating that the driver is sitting on the vehicle seat and the accelerator opening detector produces a detection output indicating that an accelerator opening is equal to a minimum value or smaller than a predetermined value; and a power supply controller for allowing supply of electric power to the electric vehicle motor as requested by the motor driving enablement command.

A control apparatus of a second embodiment of the electric vehicle may include a motor halt controller provided for cutting off power supplied to the motor when the seat detector produces a detection output indicating that the driver has not been sitting on the seat for a period of time exceeding an unoccupied seat state permissible time set in advance.

A control apparatus of a third embodiment of the electric vehicle may be equipped with a seat detector and a mounting detector for detecting that the driver has mounted the electric vehicle, and may operate wherein a motor halt controller is provided for cutting off power supplied to the motor when the seat detector produces a detection output indicating that the driver is not sitting on the seat and mounting detector produces a detection output indicating that the driver has not mounted the electric vehicle.

A control apparatus of a fourth embodiment of the electric vehicle may include a motor driving continuing controller for allowing the supply of power to the motor to be continued in response to a request for driving continuation made by a driving continuation input device.

A control apparatus of a fifth embodiment of the electric vehicle may include an electric power saving circuit provided for cutting off power supplied to other apparatuses of the vehicle except for the control apparatus, when the seat detector produces a detection output indicating that the driver has not been sitting on the seat for a period of time exceeding an unoccupied seat state permissible time set in advance and when the detection output produced by the seat detector or the detection output produced by the accelerator opening detector changes to a cut-off power state. The control apparatus may also include a warning circuit for generating an alarm sound as a result of power cut-off.

A control apparatus of a sixth embodiment of the electric vehicle may include a dc power supply electromagnetic horn driven by a pulse current at a predetermined frequency for generating an alarm sound and a verification sound indicating, among other things, that a power supply switch is turned on.

The control apparatus of the first embodiment of the electric vehicle allows electric power to be supplied to the motor only when the driver is sitting on the seat and the accelerator opening is equal to a minimum or smaller than a predetermined value. Accordingly, the engine starting operation is limited when the driver is not sitting on the seat.

Since the control apparatus of the electric vehicle of the second embodiment cuts off power supplied to the motor when the driver has not been sitting on the seat for a period of time longer than a predetermined value, the electric vehicle will not start even if the accelerator is operated. In other words, a parked electric vehicle in which the driver has forgotten to turn off the power supply switch will not start even if the accelerator is operated.

In addition, the control apparatus monitors the state of the driver's seat continuously from time to time. Accordingly, a predetermined running state of the electric vehicle can be sustained without halting the motor even if the driver departs from the seat temporarily while the electric vehicle is running.

The control apparatus of the third embodiment of the electric vehicle is equipped with a seat detector for detecting the mounting state by monitoring whether or not the driver's feet have been put on the floor of the electric vehicle and halting the motor when the feet are not put on the floor and the driver is not sitting on the seat. Accordingly, the motor operation is limited immediately when the driver departs from the seat of an electric motor bicycle, for example.

The control apparatus includes a seat detector operable in accordance with the driver's feet, which allows correct judgment of when the driver has dismounted the vehicle. Accordingly, after the driver has dismounted and left the electric vehicle, the engine will not start even if the accelerator is operated.

The control apparatus of the fourth embodiment of the electric vehicle is equipped with a motor driving continuing controller for allowing the supply of power to the motor to be continued even after the driver dismounts the electric vehicle. While walking, the driver can thus push forward an electric motor bicycle, for example.

A control apparatus of the fifth embodiment of the electric vehicle is equipped with an electric power saving circuit for cutting off the supply of power to other apparatuses except the control apparatus when the seat detector produces a detection output indicating that the driver has not occupied the seat for a period of time exceeding an unoccupied seat state permissible time set in advance. Accordingly, the amount of consumed power can be reduced.

In addition, in this power-saving state, an alarm sound is generated when the driver sits on the seat or when the accelerator is operated. In this way, the driver is reminded of the fact that the power supply switch has been turned on and that the electric vehicle is in a state ready to run immediately.

The configuration of the control apparatus of the sixth embodiment of the electric vehicle includes a dc power supply electromagnetic horn which is driven by a pulse current at a predetermined frequency for generating an alarm sound and verification sound indicating, among other things, that a power-supply switch is turned on.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
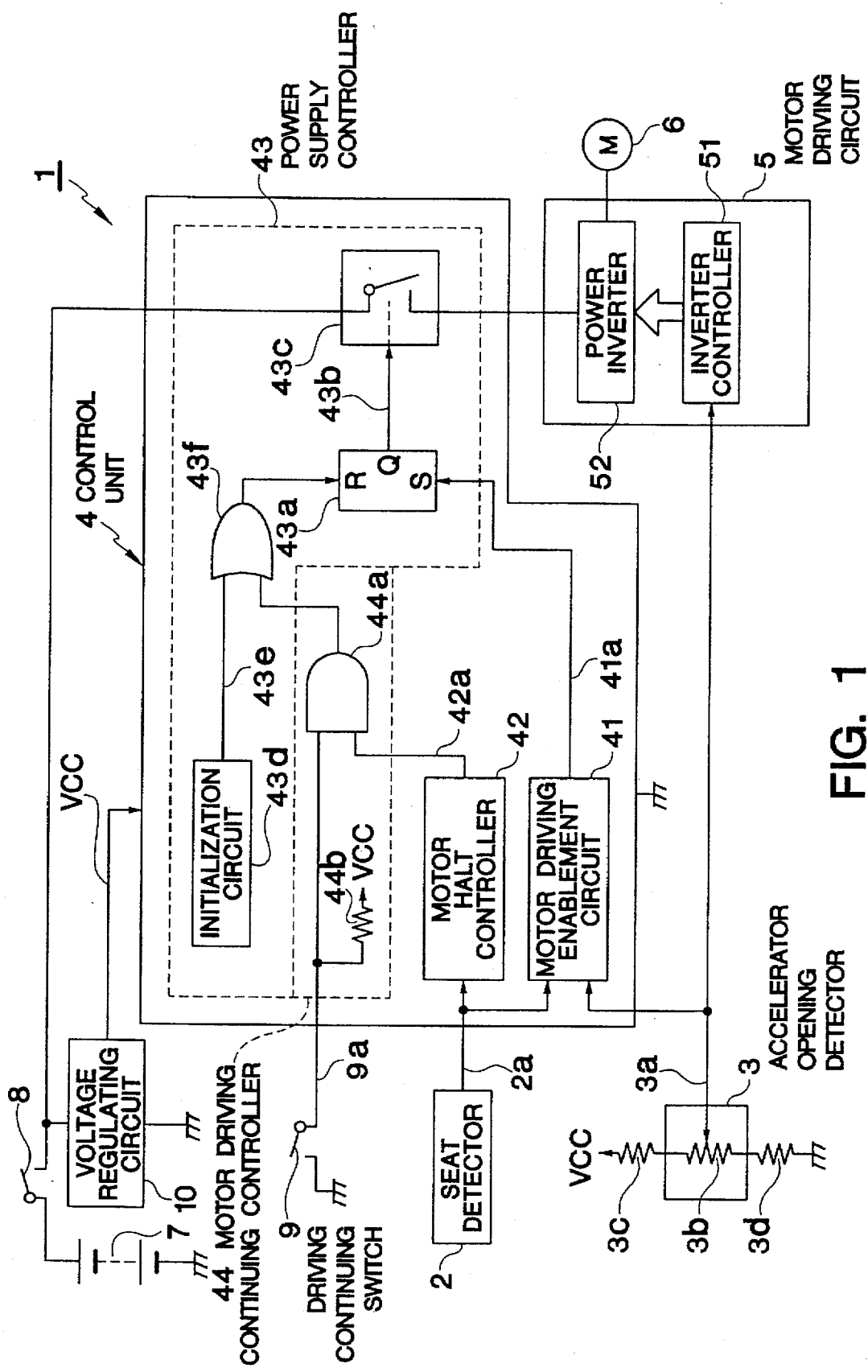
FIG. 1 is a block diagram showing the configuration of a control apparatus for electric vehicles according to an embodiment of the present invention.

The present invention will become apparent from the following description of preferred embodiments with reference to accompanying diagrams. It should be noted that the diagrams show reference numerals referred to in the description.

A block diagram showing the configuration of the control apparatus for electric vehicles according to a first embodiment is shown in FIG. 1.

Reference numeral 1 shown in FIG. 1 is the control apparatus of the electric vehicle which comprises a seat detector 2, an accelerator opening detector 3, a control unit 4, a motor driving circuit 5, a motor 6, a battery 7, a power supply switch 8, a driving continuing switch 9 and a voltage regulating circuit 10.

When the power supply switch 8 is turned on, the power supply voltage of the battery 7 is supplied to the voltage regulating circuit 10 which, in turn, provides a regulated voltage power supply VCC to the control unit 4.

The seat detector 2, which is used for verifying that the driver is sitting on the seat, employs a switch which is opened and closed to indicate whether or not the driver is sitting on the seat.

It should be noted that a pressure sensor may also be installed in the seat for detecting a weight applied to the seat. In this way, the sensor can be used to determine whether the driver is on the seat or not.

The accelerator opening detector 3 is used for measuring the amount of opening of the accelerator. The operation of the accelerator is interlocked with a slidable terminal of a variable voltage potentiometer 3b. A voltage signal 3a representing the amount of opening of the accelerator appears at the slidable terminal. As shown in FIG. 1, a resistor 3c is installed between the accelerator opening detector 3 and the regulated voltage power supply VCC whereas a resistor 3d is installed between the accelerator opening detector 3 and the ground. The resistors 3c and 3d are set at values corresponding to the maximum and minimum openings respectively.

It should be noted that a position detecting sensor or a rotation angle detector can also be used as the accelerator opening detector 3 as long as those devices can output an electrical signal which represents the amount of opening of the accelerator.

The control unit 4 further comprises a motor driving enablement circuit 41, a motor halt controller 42, a power supply controller 43 and a motor driving continuing controller 44.

Based on a seat detection signal 2a output by the seat detector 2 and a detection signal 3a output by the accelerator opening detector 3, the motor driving enablement circuit 41 makes a decision as to whether driving of the motor is permitted or not. The motor driving enablement circuit 41 issues a motor driving enablement command 41a when the seat detection signal 2a indicates an occupied seat state and the detection signal 3a indicates that the amount of opening of the accelerator is equal to a minimum or smaller than a predetermined value set in advance.

It should be noted that the driver's body may be moved causing the occupied seat signal to indicate an unoccupied seat state even if the driver remains seated. In order to solve this problem, the seat detector is designed so that an occupied seat state is regarded as valid only if this state is sustained over a predetermined period of time set in advance.

The motor halt controller 42 monitors the seat detection signal 2a. The motor halt controller 42 is designed so as to issue a command 42a for cutting off the supply of power to the motor 6 when the seat detection signal 2a supplied thereto has continuously indicated an unoccupied seat state for at least an unoccupied seat state permissible time.

The power supply controller 43 further comprises a flip-flop circuit 43a, a switch circuit 43c, a power-on initialization circuit 43d and a logical-sum circuit 43f. The flip-flop circuit 43a is set and reset by the motor driving enablement command 41a and a signal output by the logical-sum circuit 43f respectively. The motor power supply cut-off command 42a is supplied to a logical-product circuit 44a, the output of which is fed to one of the inputs of the logical-sum circuit 43f. The switch circuit 43c serves as a relay to connect or disconnect the supply of power to the motor driving circuit 5 depending upon the state of a signal 43b output by the flip-flop circuit 43a, that is, depending upon whether the flip-flop circuit 43a is set or reset. The logical-sum circuit 43f receives an initialization signal 43e output by the power-on initialization circuit 43d at the other input thereof. As described above, the signal output by the logical-sum circuit 43f resets the flip-flop circuit 43a, disconnecting the supply of power to the motor driving circuit 5. In this way, the power on initialization circuit 43d secures the establishment of an initial state at the time the power supply to the control unit 4 is turned on.

The motor driving continuing controller 44 includes the logical-product circuit 44a and a pull-up resistor 44b. The logical-product circuit 44a is used for preventing the motor power supply cut-off command 42a issued by the motor halt controller 42 from being supplied to the power supply controller 43 as long as a driving continuation request signal 9a output by operating a motor driving continuing switch 9 is active.

The motor driving circuit 5 comprises a power inverter 52 and an inverter controller 51. The power inverter 52 further comprises a plurality of power semiconductor devices forming a bridge connection. The inverter controller 51 is used for controlling the on/off timing of the power semiconductor devices employed in the power inverter 52. The function of the motor driving circuit 5 is to raise power supplied to the motor 6 in response to an increase in the accelerator opening detection signal 3a in order to output a larger torque and, on the other hand, to reduce the power supplied to the motor 6 in response to a decrease in the accelerator opening detection signal 3a in order to output a smaller torque.

The motor driving circuit 5 is designed so that no power is supplied for an accelerator opening detection signal 3a representing the minimum accelerator opening.

It should be noted that, in the case of an electric vehicle equipped with a clutch mechanism such as an automatic centrifugal clutch between the output axis of the motor 6 and the driving axis of the electric motor, the motor driving circuit 5 may be designed to drive the motor 6 even for an accelerator opening detection signal 3a representing the minimum accelerator opening at a rotation speed that does not put the automatic centrifugal clutch in an engaged state.

Next, the operation of the control apparatus for electric vehicles according to this illustrated embodiment is explained.

When the power supply switch 8 is turned on, the power supply VCC is supplied to the control unit 4. At that time, the initialization signal 43e output by the initialization circuit 43d is supplied to a reset input pin R of the flip-flop circuit 43a through the logical-sum circuit 43f, resetting the flip-flop circuit 43a. The output signal 43b appearing at an output pin Q of the flip-flop circuit 43a is thereby pulled down to a low level L, turning off the switch circuit 43c. In this state, initialization takes place.

When the driver sits in the seat and the accelerator opening is manipulated to a minimum value, the motor driving enablement circuit 41 issues a motor driving enablement command 41a for setting the flip-flop circuit 43a. The output signal 43b at the output pin Q is thereby raised to a high level H, turning on the switch circuit 43c.

Accordingly, power is supplied to the motor driving circuit 5 which controls the supply of power to the motor 6 in accordance with the accelerator opening detection signal 3a received from the accelerator opening detector 3. In this state, the electric motor 6 is in a state ready to rotate.

When the driver does not sit in the seat for a period of time longer than a predetermined value, the motor halt controller 42 issues the command 42a to cut off power supplied to the motor 6. The motor power supply cut-off command 42a is supplied to the reset input pin R of the flip-flop circuit 43a through the logical-product circuit 44a and the logical-sum circuit 43f, resetting the flip-flop circuit 43a. The switch circuit 43c is thereby turned off, cutting off the supply of power to the motor 6.

When the motor driving continuing switch 9 is turned on, one of the inputs of the logical-product circuit 44a is pulled down to the low level L, preventing the motor power supply cut-off command 42a from being propagated to the reset pin R of the flip-flop circuit 44a. As a result, the flip-flop circuit 44a is not reset. Accordingly, the motor 6 is driven in accordance with the accelerator opening detection signal 3a output by the accelerator opening detector 3.

As described above, the seat detector 2 and the accelerator opening detector 3 included in the configuration of the control apparatus do not allow the electric vehicle to move unless the driver is sitting in the seat and the accelerator is put at a minimum opening position. In this way, the electric vehicle can be prevented from moving when the driver's seat is unoccupied.

In addition, when the driver's seat is unoccupied for a period of time longer than a predetermined value, the supply of power to the motor 6 is cut off. In this state, the electric vehicle cannot move even if the accelerator is operated. By manipulating the motor driving continuing switch 9, however, the operation of the motor 6 will be maintained.

Figure 2:
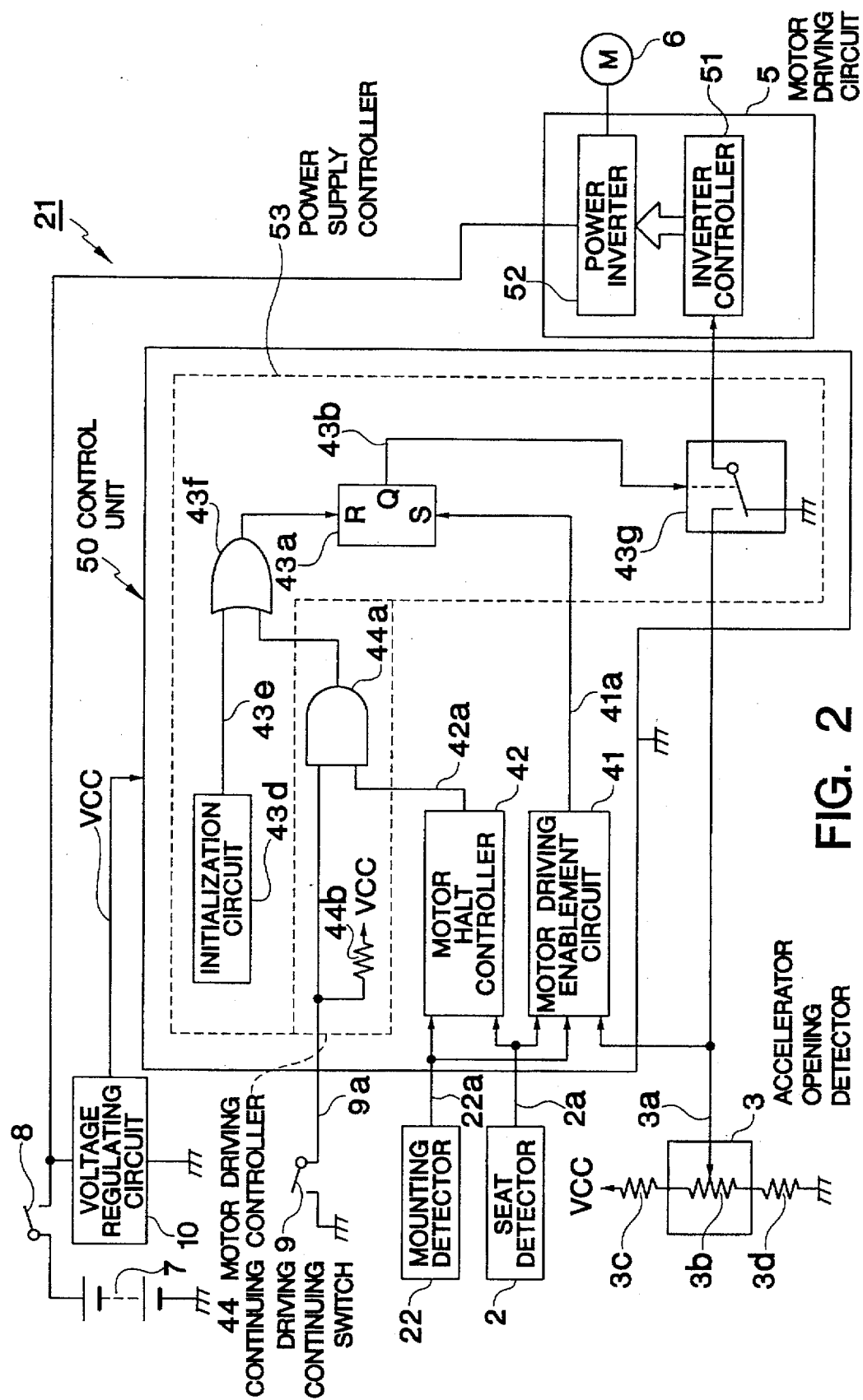
FIG. 2 is a block diagram showing the configuration of a control apparatus for electric vehicles according to another embodiment of the present invention.

A block diagram showing the configuration of the control apparatus for electric vehicles according to a second embodiment is shown in FIG. 2.

This electric vehicle control apparatus 21 of FIG. 2 is somewhat different from the control apparatus of FIG. 1 in that the former is equipped with a mounting detector 22.

The mounting detector 22 is implemented by floor switches or the like which are actuated when the driver puts his feet on the floor of the electric vehicle.

A pressure sensor installed at a location where the driver's feet are placed can also be used as the mounting detector 22. Such a sensor generates a pressure detection signal which indicates whether the driver has mounted the electric vehicle or not.

Normally, two floor switches or equivalent devices are used for the right and left feet respectively. Signals output by the floor switches are supplied to a logical-sum circuit that in turn outputs a detection signal 22a indicating whether or not the driver has mounted the electric vehicle.

The motor halt controller 42 typically includes a logical-product circuit receiving the detection signal 22a output by the mounting detector 22 and the detection signal 2a output by seat detector 2. When the detection signal 22a indicates that the driver has not mounted the electric vehicle and the detection signal 2a indicates that the driver has not occupied the seat, the logical - product circuit outputs the motor power supply cut-off command 42a typically at the high level H.

A motor driving enablement circuit 41 outputs the motor driving enablement command 41a when the detection signal 22a indicates that the driver has mounted the electric vehicle, the detection signal 2a indicates that the driver has occupied the seat and the accelerator opening detection signal 3a indicates a minimum accelerator opening or an accelerator opening smaller than a predetermined value.

It should be noted that the decision made by the motor driving enablement circuit 41 is also based on the detection signal 22a output by the mounting detector 22. Accordingly, when the floor switches are not actuated, the motor 6 cannot be started.

The power supply controller 53 includes a switch circuit 43g connected to the input of the inverter controller 51. When the signal 43b output by the flip-flop circuit 43a is low (L), the switch circuit 43g is opened, preventing the accelerator opening detection signal 3a from being supplied to the inverter controller 51. In this state, a voltage corresponding to the minimum accelerator opening or a lower voltage is applied to the inverter controller 51, halting the operation of the motor driving circuit 5. As a result, the supply of power to the motor 6 is cut off.

With the motor driving continuing switch 9 actuated, the motor driving continuing controller 44 forces the logical-sum circuit 44a to work as if the motor power supply cut-off command 42a was set at the low level L. This state of the logical-sum circuit 44a also results when at least one of the input signals supplied to the motor halt controller 42 indicates that the driver has occupied the seat and/or the driver has mounted the electric vehicle.

With the configuration described above, the control apparatus 21 for electric vehicles according to this embodiment can detect the driver dismounting the electric vehicle with a high degree of reliability, halting the operation of the motor 6. As a result, the electric vehicle can be put in an inoperative state without regard to the accelerator opening.

Figure 3:
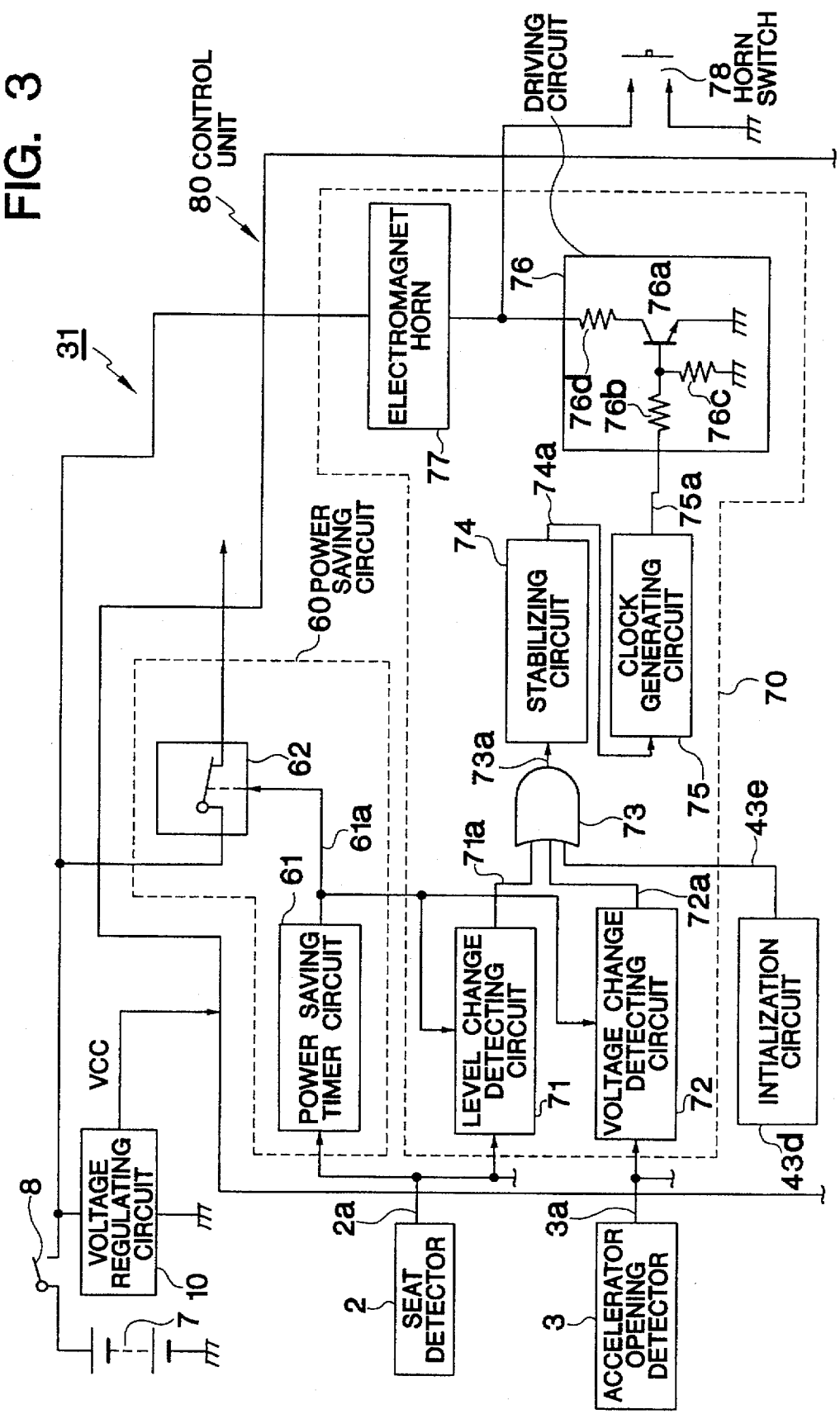
FIG. 3 is a block diagram showing the configuration of a control apparatus for electric vehicles according to a still further embodiment of the present invention.

A block diagram showing a configuration of the control apparatus for electric vehicles according to a third embodiment is shown in FIG. 3. It should be noted that FIG. 3 shows only a control unit 80 of the control apparatus 31 for the electric vehicle. The remaining parts of the control apparatus 31 are the same as those of FIGS. 1 or 2 and therefore are not shown in FIG. 3. As shown in FIG. 3, the control unit 80 comprises a power saving circuit 60 and a warning circuit 70. The power saving circuit 60 further comprises a power saving timer circuit 61 and a power saving switch circuit 62.

If a permissible time determined in advance has elapsed while the detection signal 2a output by the seat detector 2 indicates that the driver has not occupied the seat, the power saving timer circuit 61 outputs a time-out signal 61a typically at a high level H. Once the time-out signal 61a has been set to the high level H, it will not immediately be restored to a low level L even if the detection signal 2a output by the seat detector 2 indicates that the driver has occupied the seat. The time-out signal 61a will not be restored to the low level L until a time typically, of the order of 100 milliseconds has elapsed since detection by the seat detector 2 that the driver has occupied the seat.

The power-saving switch circuit 62 includes a relay circuit which can enable or cut off the supply of power to other devices of the electric vehicle depending upon the state of the time-out signal 61a.

With the above configuration, the power saving timer circuit 61 will trip, activating the time-out signal 61a, when the predetermined time has elapsed from when the driver dismounted the electric vehicle with the power supply switch 8 left in a turned-on state. As a result, the power-saving switch circuit 62 enters a cut-off state, cutting off the supply of power to other devices in a power saving state.

If the monitoring time of the power saving timer circuit 61 is equal in length to that of the motor halt controller 42, the power saving switch circuit 62 can also be operated by utilizing the motor halt controller 42. In this case, the power saving timer circuit 61 can thus be eliminated.

Furthermore, in the case of a configuration wherein power is supplied to the motor driving circuit 5 and other devices through the switch circuit 43c shown in FIG. 1, the power saving switch circuit 62 is also not required as well.

The warning circuit 70 comprises a level change detecting circuit 71, a voltage change detecting circuit 72, a logical-sum circuit 73, a stabilizing circuit 74, a clock generating circuit 75, a driving circuit 76, an electromagnetic horn 77 and a horn switch 78 installed in parallel to the driving circuit 76. The level change detecting circuit 71 is used for generating a pulse signal 71a by detecting changes in level of the seat detection signal 2a. The voltage change detecting circuit 72 is used for generating a pulse signal 72a by detecting changes in voltage of the accelerator opening detection signal 3a. The logical-sum circuit 73 receives the pulse signals 71a and 72a as well as the initialization signal 43e output by the initialization circuit 43d. The logical-sum circuit 73 outputs a signal 73a to the stabilizing circuit 74 for generating a pulse 74a having a width of several tens to several hundreds of milliseconds which is supplied to the clock generating circuit 75. While the pulse 74a is being supplied to the clock generating circuit 75, a clock signal 75a is output by the clock generating circuit 75 at a predetermined frequency.

The level change detecting circuit 71 and the voltage change detecting circuit 72 detect changes in level and voltage respectively only when the time-out signal 61a is supplied thereto. In other words, the pulse signals 71a and 72a are generated only while the time-out signal 61a is being supplied to the level change detecting circuit 71 and the voltage change detecting circuit 72.

The driving circuit 76 is a switching circuit employing an NPN transistor 76a. Reference numeral 76b denotes a base resistor whereas reference numeral 76c is a resistor between the base and the emitter. A collector resistor 76d serves as a resistor for limiting current and thus for adjusting the volume of sound generated by the electromagnetic horn 77. The current limiting resistor 76d can be eliminated if necessary.

With the configuration described above, the electromagnetic horn 77 of the warning means 70 is driven to generate alarm sound when the accelerator is operated or the driver occupies the seat in a power saving state.

In addition, sound for verifying an operation is generated by the initialization signal 43e when the power supply switch 8 is turned on.

In a power saving state, LED indicators of the electric vehicle are thus turned off as if the power supply switch 8 were in an off state. When the accelerator is operated, however, an alarm sound is generated to attract the driver's attention. In addition, the electric vehicle is switched automatically to a state ready to run as soon as the driver occupies the seat. Also at that time, alarm sound is generated as well to attract the driver's attention.

Moreover, the alarm sound and the sound for verifying an operation are generated by the electromagnetic horn 77 which is also used as a klaxon. Accordingly, it is not necessary to separately provide a voltage horn or the like.

In the embodiments shown in FIGS. 1 to 3, the control units 4 and 50 are implemented using random logic circuits as described above. It should be noted, however, that the control units 4 and 50 can also each be implemented by a microcomputer which executes a microprogram for carrying out control operations.

Figure 4:
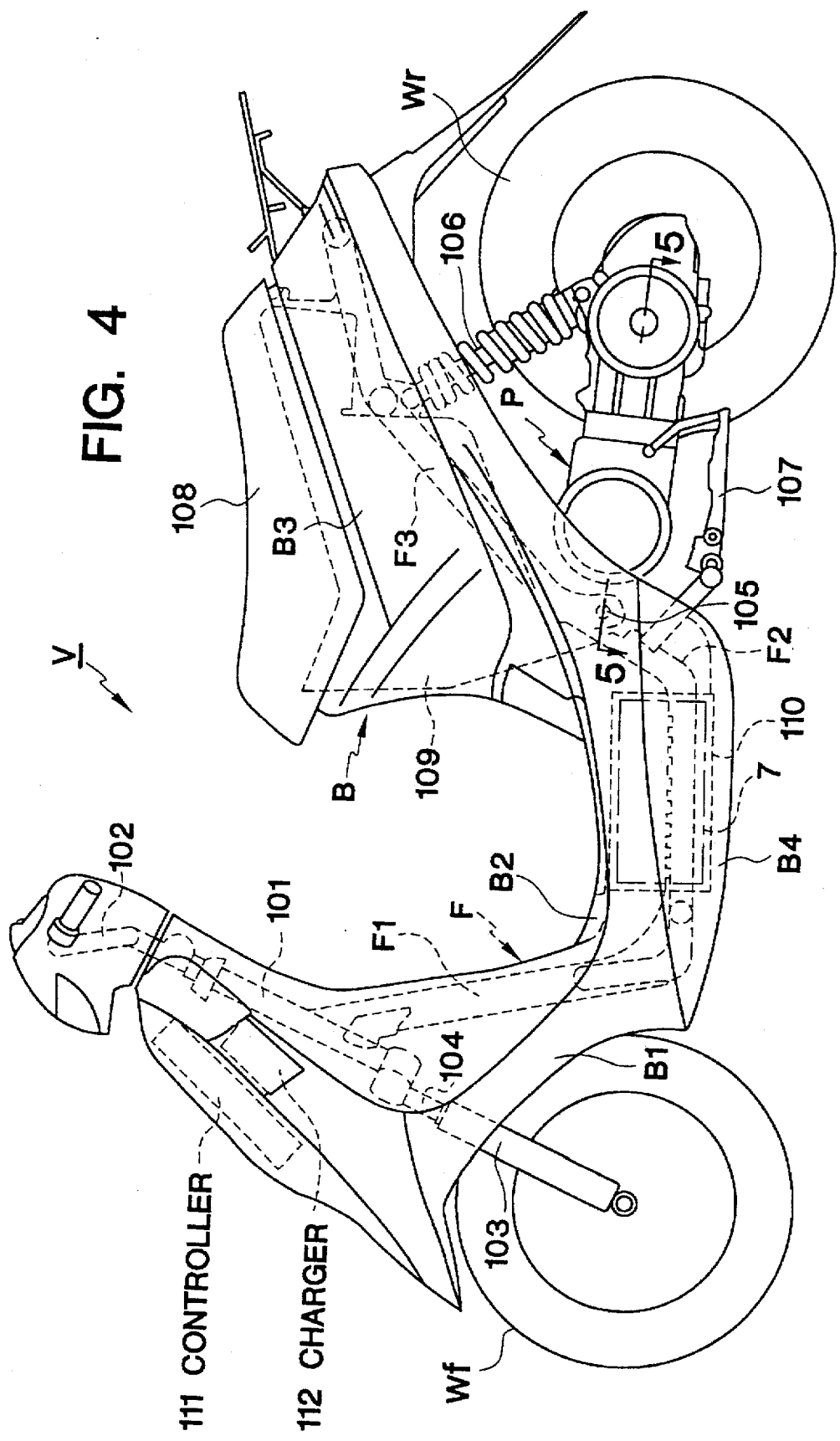
FIG. 4 is an overall side view of an electric motor bicycle equipped with a control apparatus provided by the present invention.

An overall side view of an electric motor bicycle equipped with a control unit using a microcomputer is shown in FIG. 4. As shown in FIG. 4 the frame F of the vehicle body comprises a front frame F1, a middle frame F2 and a rear frame F3 which are made of a steel pipe. The outer side is covered with a body B made of compound resin. The body B comprises a leg seal B1, a step floor B2, a rear cover B3 and an under cover B4. A head pipe 101 is installed on the front frame F1. A driving direction handle 102 is fixed on the upper end of the head pipe 101 whereas a front fork 104 is fixed on the lower end thereof. The front fork 104 drives a front wheel Wf through a front cushion or shock absorber 103.

A pivot 105 is fixed to the middle frame F2. The front end of a swing type power unit P is supported by the pivot 105 in such a way that the power unit P can move up and down freely. The power unit P also serves as a rear fork of a rear wheel Wr. The rear wheel Wr is attached to the rear end of the power unit P and driven thereby in a cantilever arrangement.

A stand 107 provided on the middle frame F2 covers the front lower surface of the power unit P at a storing position shown in the figure. The stand 7 accommodates a driving motor to be described later and serves as a protective device of the driving motor accommodated on the bicycle. A storage container 109 is placed on the power unit P. The storage container 109 can be opened and closed by moving a seat 108 which is supported on the electric motor bicycle in such a way that the seat can move up and down freely with respect to the electric motor bicycle.

A battery box 110 is installed on the middle frame F2 for accommodating a battery 7 used as a power supply for driving the electric vehicle. In front of the head pipe 101, a controller 111 for controlling the operation to drive the motor 6 and a charger 112 for electrically charging the battery 7 are provided.

Figure 5:
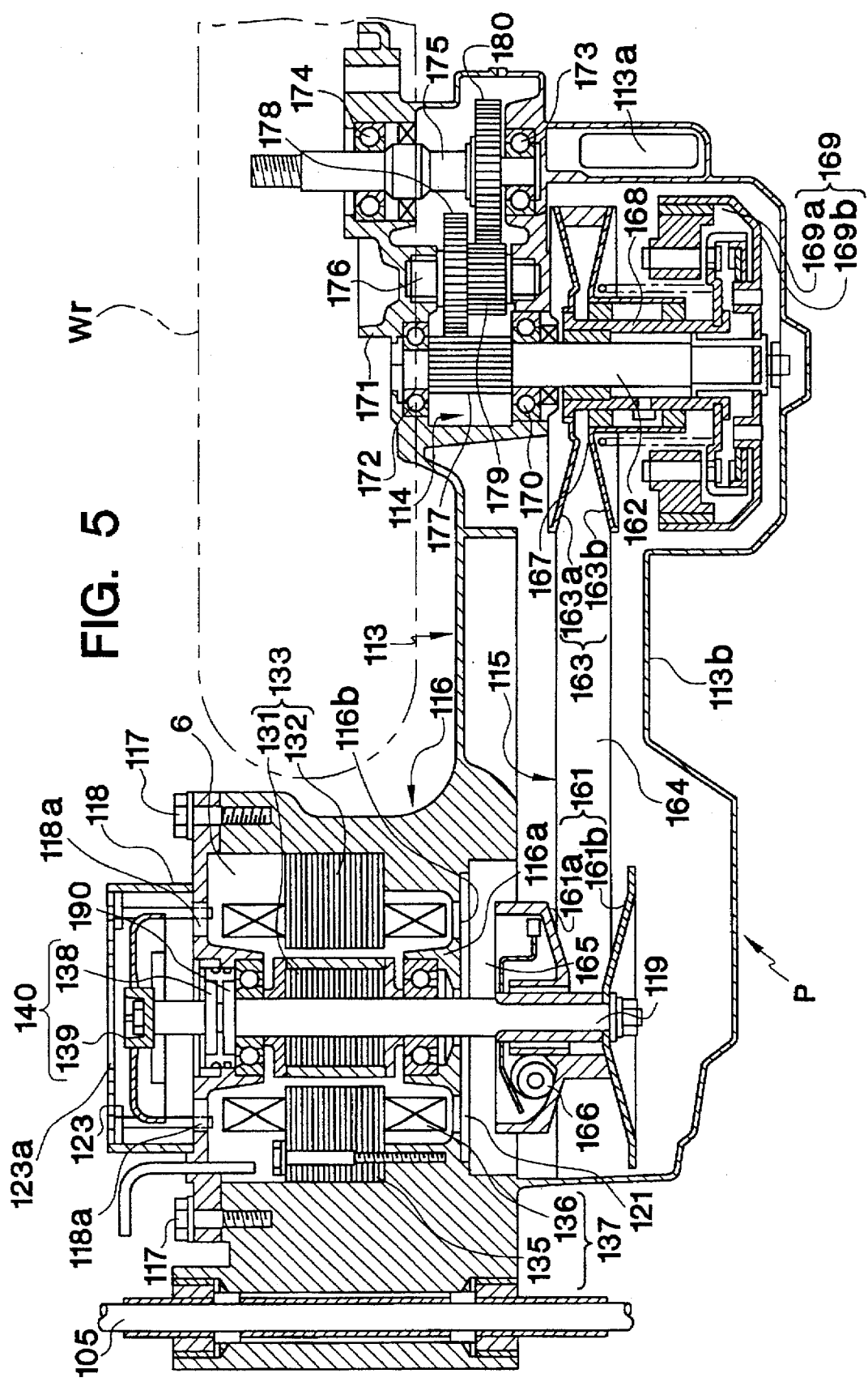
FIG. 5 shows a cross section of a power unit on a line 5—5 shown in FIG. 4.

FIG. 5 is a diagram showing a cross section along line 5—5 of the power unit P shown in FIG. 4.

As shown in the figure, the power unit P has a transmission case 113 through which the pivot 105 protrudes from the right to left. The motor 6 at the front and reduction gears 114 at the rear are joined to each other through a belt-type non-stage transmission 115.

The motor 6 is accommodated in a motor housing 116 which is fixed to the front of the transmission case 113 to form an integrated single assembly. An opening on the right side surface of the motor housing 116 is veiled with a cover 118 which is attached by bolts 117. A rotation axis 119 of the motor 6 is held by a ball bearing 120 provided on the cover 118 and a ball bearing 121 provided on a wall 116a on the right end of the motor housing 116.

A cooling fan 122 is installed at the right end of the rotation axis 119 which protrudes out of the cover 118. The cooling fan is veiled by a fan cover 123 having air inlets 123a on the circumference thereof. Air drawn in through the air inlets 123a by the cooling fan 122 flows into the inside of the motor housing 116 through the cover 118. After cooling the motor 6, the air is supplied into the transmission case 113 through passageways 116b of the wall 116a.

The air further flows through the inside of the transmission case 113 toward the rear part thereof, cooling the belt-type non-stage transmission 115.

The air is finally exhausted to the outside through an air outlet 113a formed at the rear of the transmission case 113. On the other hand, the left end of the rotation axis 119, which protrudes through the wall 116a of the motor housing 116, extending to the inside of the transmission case 113, is directly used as an input axis of the belt-type non-stage transmission 115.

The motor 6 is a direct-current brushless motor. The motor 6 comprises a rotor 133, a stator 137, a rotor position sensor 140 and a rotational speed sensor 190. The rotor 133 further comprises a permanent magnet 132 attached to the circumference of an iron core 131 which is attached to the rotation axis 119. The stator 137 further comprises coils 136U, 136V and 136W illustrated in FIG. 6 which form a Y connection. The coils 136U, 136V and 136W are wound around an iron core 135 that is fixed inside the motor housing 116 by a bolt 134. The rotor position sensor 140 further comprises three Hall devices 139 installed at locations facing the circumference of a magnet 138 fixed on the rotation axis 119. The rotational speed sensor 190 is used for measuring the rotational speed of the motor 6.

The belt-type non-stage transmission 115 comprises a driving pulley 161 and a driven pulley 163. The driving pulley 161 is attached to the rotation axis 119 protruding from the motor housing 116 toward the inside of the transmission side 113. The driven pulley 163 is, on the one hand, attached to a reduction gear input axis 162 held on the rear part of the transmission case 113. A loop belt 164 is wound around the driving pulley 161 and the driven pulley 163.

The driving pulley 161 further comprises a fixed side pulley half body 161a attached to the rotation axis 119 and a movable side pulley half body 161b attached on the rotation axis 119. The movable side pulley half body 161b can slide freely in the axial direction of the rotation axis 119. A centrifugal weight 166 is installed between the movable side pulley half body 161b and a ramp plate 165 fixed on the rotation axis 119 in such a way that the centrifugal weight 166 can be moved freely in the radial direction.

On the other hand, the driven pulley 163 also comprises a fixed side pulley half body 163a and a movable side pulley half body 163b. The fixed side pulley half body 163a is fixed to a collar 168 which is attached to the reduction gear input axis 162 through a needle bearing 167 in such a way that the collar 168 can be freely rotated around the reduction gear input axis 162. A driving force transmitted to the driven pulley 163 is forwarded to the reduction gear input axis 162 through an automatic centrifugal clutch 169.

A side of the transmission case 113 for accommodating the belt-type non-stage transmission 115 and the automatic centrifugal clutch 169 is veiled by a side cover 113b which can be installed and removed with ease. In applications for use in a normal running state, the automatic centrifugal clutch 169 comprises a first clutch 169a and a second clutch 169b. The first clutch 169a is used for transmitting the rotation of the motor 6 to the rear wheel Wr, that is, for transmitting the rotation of the driven pulley 163 to the reduction gear input axis 162. The second clutch 169b is, on the other hand, used for transmitting the rotation of the rear wheel Wr, to experience the effect of an engine brake, to the motor 6, that is, for transmitting the rotation of the reduction gear input axis 162 to the driven pulley 163.

The reduction gear input axis 162 is supported by a ball bearing 170 attached to the transmission case 113 and a ball bearing 172 attached to a reduction gear cover 171. A middle axis 176 is installed between a vehicle axis 175 of the rear wheel Wr and the reduction gear axis 162. Much like the reduction gear input axis 162, the vehicle axis 175 is supported by a pair of ball bearings 173 and 174 which are fixed on the transmission case 113 and the reduction gear cover 171 respectively. In this way, the rotation of an input gear 177 of the reduction gear axis 162 is transmitted to an output gear 180 of the vehicle axis 175 through two middle gears 178 and 179 of the middle axis 176.

Figure 11:
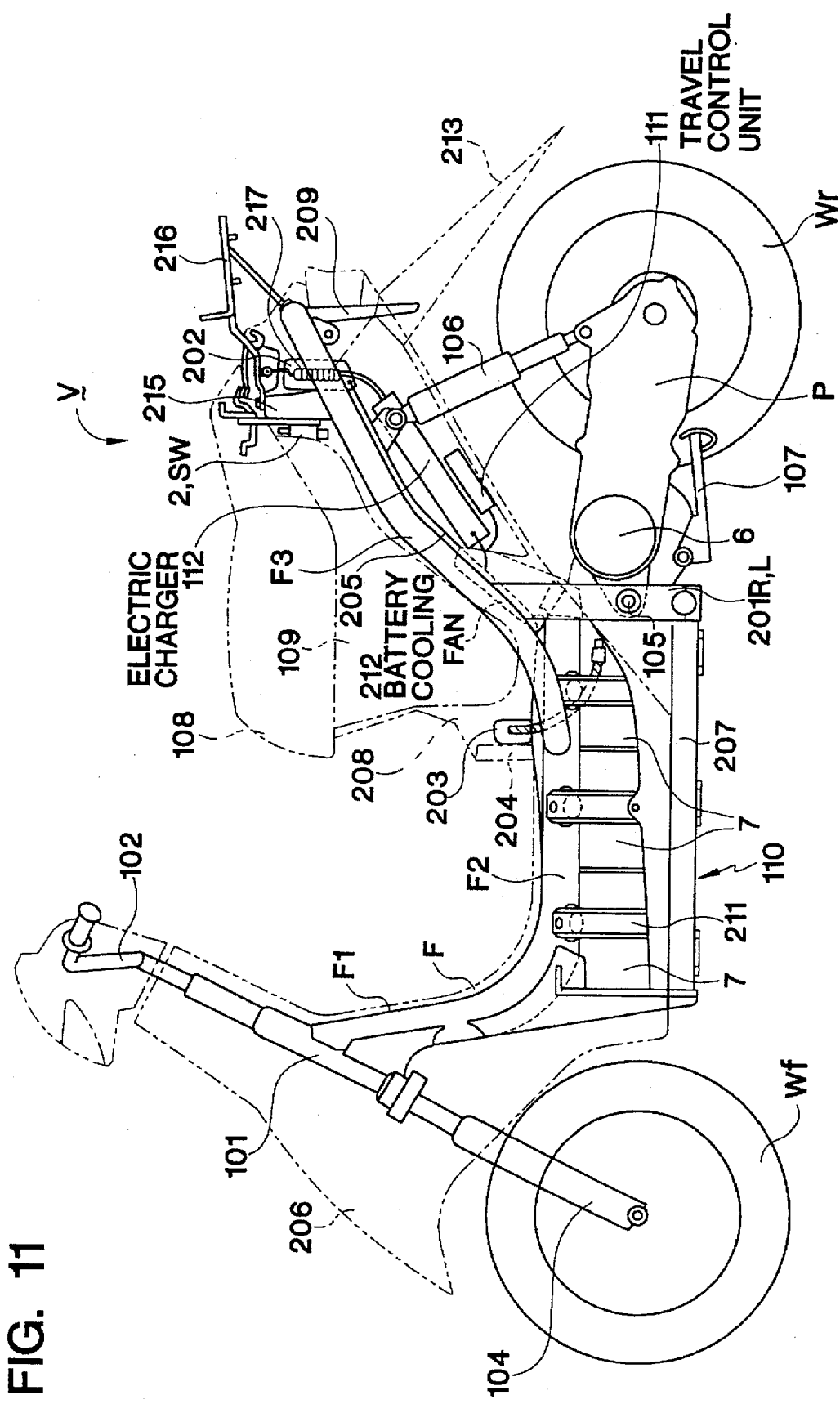
FIG. 11 is an overall side view of another embodiment of an electric motor bicycle equipped with a control unit including a microcomputer.

It should be noted that the configuration of the seat detector 2 mentioned in FIGS. 1 to 3 and its installation structure to the vehicle body frame and its mechanical operation are described in detail by referring to FIG. 11 and subsequent figures.

Figure 6:
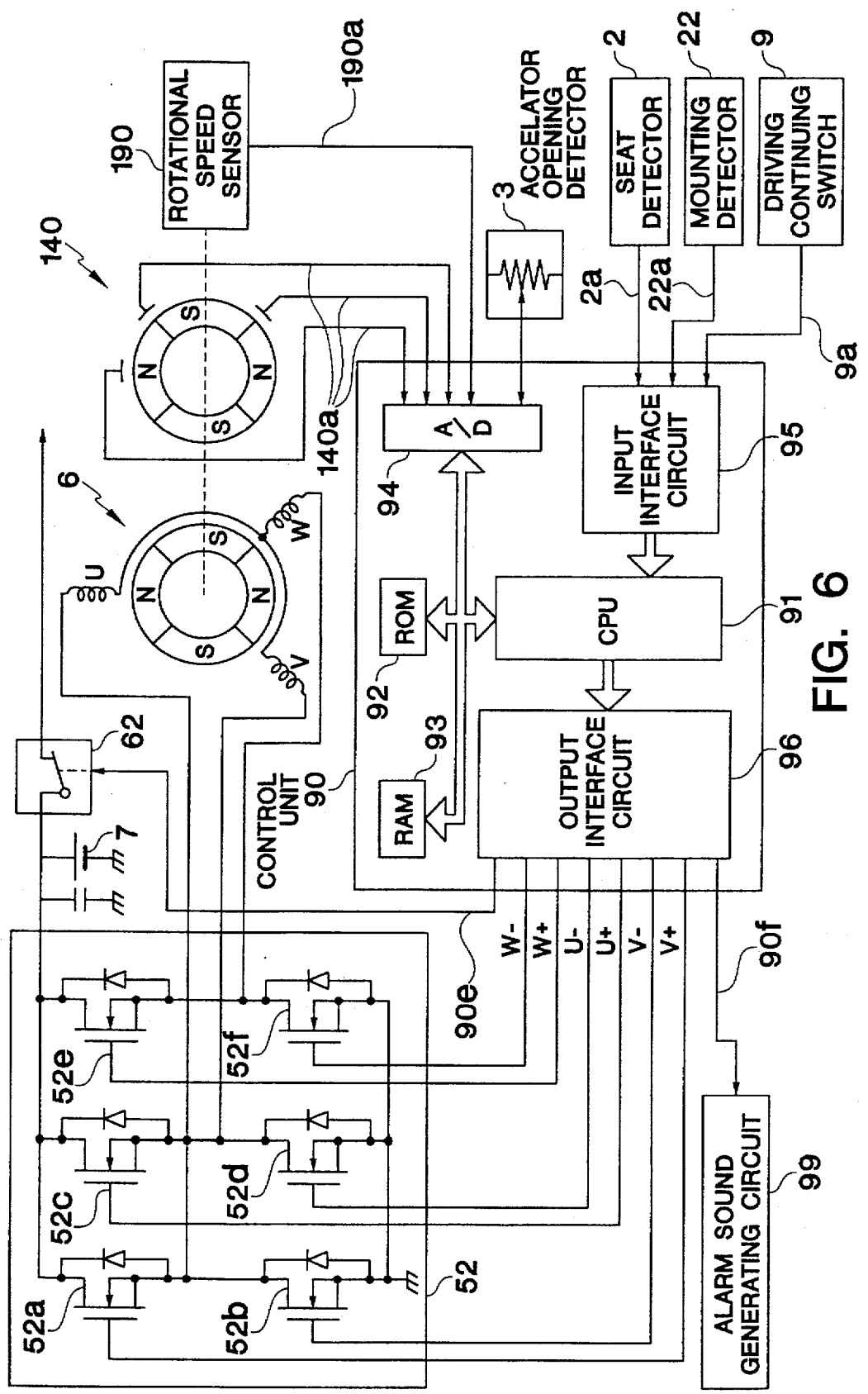
FIG. 6 is a block diagram showing the configuration of a control system of an electric motor of an embodiment of the present invention.

A block diagram illustrating the configuration of a control system of the motor 6 is shown in FIG. 6. As shown in the figure, a control unit 90 comprises a CPU (Central Processing Unit) 91, a ROM unit 92 for storing a program, a RAM unit 93 including a work area, an A/D converter 94, an input interface (I/F) circuit 95 and an output interface (I/F) circuit 96.

Signals 140a output by the rotor position sensor 140, a signal 190a output by a rotational speed sensor 190 and the detection signal 3a output by the accelerator opening detector 3 are converted by the A/D converter 94 into digital signals which are then supplied to the CPU 91.

The detection signal 2a output by the seat detector 2, the detection signal 22a output by the mounting detector 22 and the driving continuation request signal 9a provided by the motor driving continuing inputting circuit or switch 9 are supplied to the CPU 91 through the input interface circuit 95.

Figure 7:
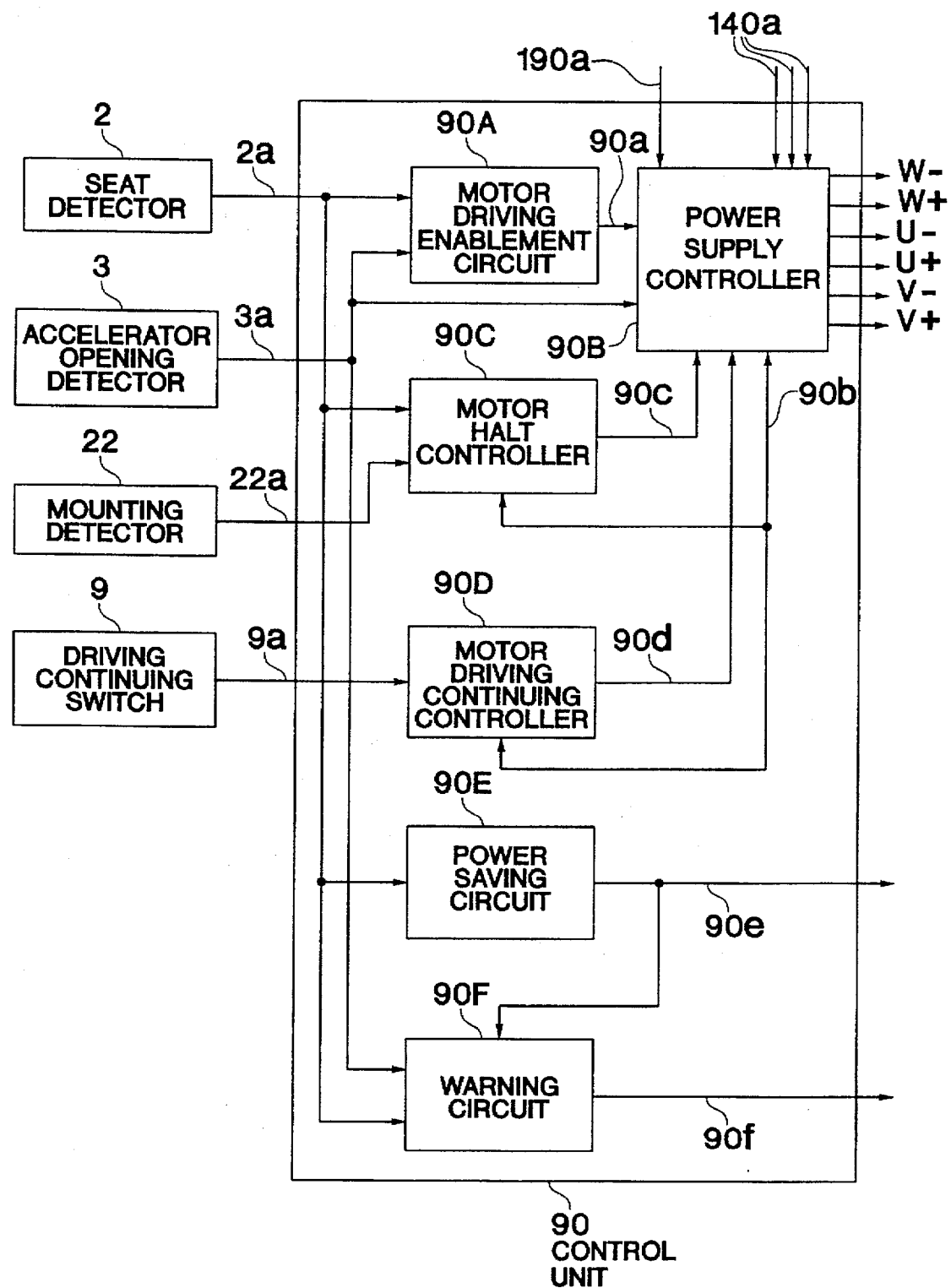
FIG. 7 is a diagram showing the configuration of functional blocks of the control unit shown in FIG. 6.

FIG. 7 is a diagram showing the configuration of functional blocks constituting the control unit 90. As shown in the figure, the control unit 90 comprises a motor driving enablement circuit 90A, a power supply controller 90B, a motor halt controller 90C, a motor driving continuing controller 90D, a power saving circuit 90E and a warning circuit 90F.

When the seat detector 2 activates the detection signal 2a to indicate that the driver has occupied the seat and the accelerator opening detector 3 activates the detection signal 3a to indicate that the accelerator opening is equal to a minimum or smaller than a predetermined value, the motor driving enablement circuit 90A issues a motor driving enablement command 90a.

When the motor driving enablement command 90a is activated, the power supply controller 90B issues conduction commands W−, W+, U−, U+, V− and V+ to field-effect transistor FETs 52a to 52f of the power inverter 52 shown in FIG. 6 based on the detection signals 140a output by the rotor position sensor 140 and the detection signal 190a output by the rotational speed sensor 190 so as to rotate the motor 6 at a rotational speed corresponding to an accelerator opening measured by the accelerator opening detector 3.

When a command 90c to halt the supply of power to the motor 6 is received from the motor halt controller 90C, the power supply controller 90B stops output of the conduction commands W−, W+, U−, U+, V− and V+ to halt the rotation of the motor 6. The command 90c is referred to hereafter as a motor power supply halting command.

The power supply controller 90B is designed so that the conduction commands W−, W+, U−, U+, V− and V+ are output when a driving continuation request 90d is received.

With a motor driving state output 90b from the power supply controller 90B activated to indicate a motor rotating state, the motor halt controller 90C issues a motor power supply halting command 90c when the seat detector 2 outputs a detection signal 2a to indicate that the driver has not occupied the seat for a period of time longer than an unoccupied seat state permissible time set in advance.

The motor halt controller 90C also issues a motor power supply halting command 90c when the detection signal 2a output by the seat detector 2 indicates that the driver has not occupied the seat and the detection signal 22a output by the mounting detector 22 indicates that the driver has not mounted the electric vehicle. As described earlier, the mounting detector 22 is used for detecting whether or not the feet of the driver have been put on the floor of the electric vehicle.

With a motor driving state signal 90b output by the power supply controller 90B activated to indicate a rotating state of the motor 6, the motor driving continuing controller 90D issues a driving continuation command 90d when the driving continuation inputting unit 9, typically implemented by a motor driving continuing switch, outputs a signal representing a request for driving continuation.

The power supply controller 90B is designed so as to continue the rotation of the motor 6 in response to the driving continuation command 90d. The driving continuation command 90d can be supplied to the motor halt controller 90C instead of the power supply controller 90B. In this scheme, the motor halt controller 90C freezes judgment operations related to the halting of the motor 6 as long as the driving continuation command 90d is activated.

In addition, the motor driving continuing circuit 90D can also be designed so that the driving continuation command 90d is issued in response to a request to continue driving given by the driving continuation inputting unit 9 regardless of whether the motor 6 is rotating or in a standstill state.

The power saving circuit 90E monitors the detection signal 2a output by the seat detector 2. If the driver has not occupied the seat for a period of time longer than a predetermined value, a power saving command 90e is issued.

The power saving command 90e controls the power saving switch circuit 62 shown in FIG. 6 to be in an off state, cutting off the supply of power to all devices other than the control apparatus.

With a power saving command 90e issued, the warning circuit 90F activates an alarm signal 90f when the detection signal 2a output by the seat detector 2 changes and the detection signal 3a output by the accelerator opening detector 3 also changes. The alarm signal 90f actuates typically an electromagnetic horn employed in an alarm sound generating circuit 99 shown in FIG. 6, producing an audible warning.

Figure 8:
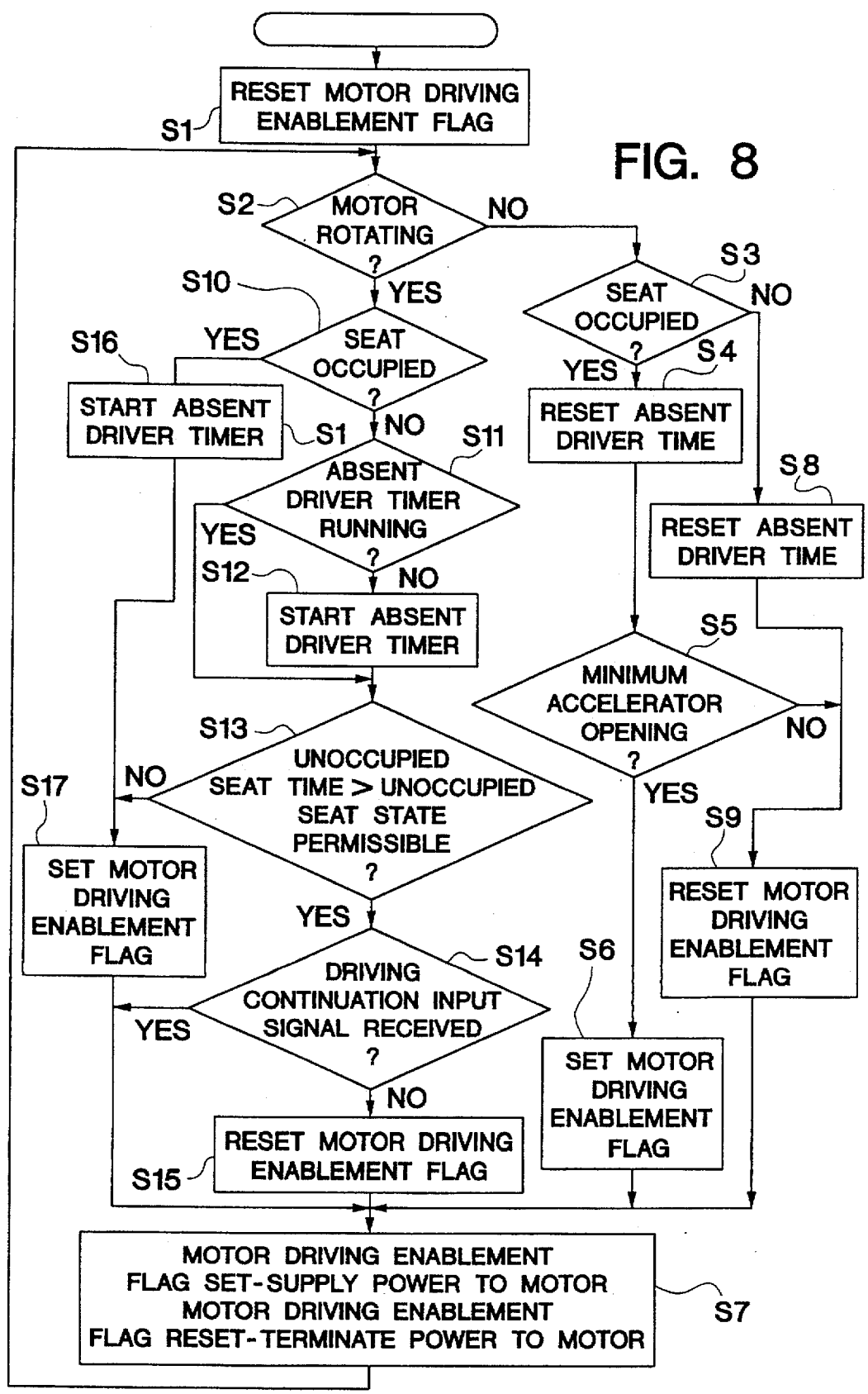
FIG. 8 is a flowchart illustrating the operation of the control apparatus according to FIG. 1 embodiment of the present invention.

A flowchart indicating the operation of the control apparatus for electric vehicles according to the first embodiment is shown in FIG. 8.

As shown in the figure, the flowchart begins with a step S1 at which the CPU 91, first of all, resets a motor driving enablement flag to put the motor 6 in a standstill state when the power supply switch is turned on. The flow continues to the following step S2 to determine whether the motor 6 is rotating or in a standstill state. If the motor 6 is found to be in a standstill state at the step S2, the flow goes to a step S3 at which the seat detection signal 2a is examined. If the detection signal 2a is found at step S3 to indicate that the driver is sitting in the seat, the flow continues to a step S4 at which an absent driver timer is reset. It should be noted that the absent driver timer is used for measuring the time during which the driver does not occupy the seat. At a subsequent step S5, the accelerator opening is measured. If the accelerator opening is found equal to a minimum or smaller than a predetermined value at the step S5, the flow continues to a step S6 at which the motor driving enablement flag is set.

The flow further continues to a step S7 at which the motor driving enablement flag is examined. If the motor driving enablement flag is found set at the step S7, power is supplied to the motor 6 to rotate it. If the motor driving enablement flag is found reset at the step S7, however, the supply of power to the motor 6 is terminated.

If the driver is not determined to be occupying the seat at the step S3, on the other hand, the flow continues to a step S8 at which the absent driver timer is reset. At the following step S9, the motor driving enablement flag is reset.

If the driver is determined to be occupying the seat at the step S3 but the accelerator opening is found greater than the predetermined value at the step S5, on the other hand, the flow also continues to the step S9 at which the motor driving enablement flag is reset, not allowing the motor 6 to be driven.

As described above, the motor driving enablement flag is set at the step S6. In this case, the motor 6 starts rotating, entering a rotating state. The flow then returns to the step S2 through the step S7. Now that the motor 6 is determined to be rotating at the step S2, processing of a step S10 and subsequent steps are carried out.

At the step S10, the first step with the motor 6 rotating, the control apparatus first of all determines whether the driver has occupied the seat or not. If the driver has not occupied the seat, the flow continues to a step S11 at which the absent driver timer is checked. If the absent driver timer is found already running at the step S11, the flow continues to a step S13. Otherwise, the absent driver timer is started at a step S12 before going to the step S13.

At the step S13, the period of time during which the driver has not occupied the seat is compared to an unoccupied seat state permissible time determined in advance. If the former is found greater than the latter at the step S13, the flow continues to a step S14 to determine whether or not a driving continuation input has been received from the driving continuation switch 9. If no driving continuation input is found or if the motor driving continuation switch 9 is found off at the step S14, the flow continues to a step S15 at which the motor driving enablement flag is reset. With the motor driving enablement flag reset, the supply of power to the motor 6 is terminated at the following step S7.

If the driver is found to have occupied the seat at the step S10, on the other hand, the flow continues to a step S16 at which the absent driver timer is started. At a subsequent step S17, the motor driving enablement flag is set. With the motor driving enablement flag set, the supply of power to the motor 6 is continued at the following step S7. In addition, if the period of time during which the driver is absent is found at the step S13 to be shorter than the unoccupied seat state permissible time determined in advance, however, the flow also continues to the step S17 to set the motor driving enablement flag. With the motor driving enablement flag set, the supply of power to the motor 6 is continued at the following step S7 as described above.

If a driving continuation input is found or if the motor driving continuation switch 9 is found turned on at the step S14, the flow also continues to the step S17 at which the motor driving enablement flag is set. With the motor driving enablement flag set, the supply of power to the motor 6 is likewise continued at the following step.

With the configuration described above, the motor 6 is started if the driver occupies the seat and the accelerator opening is smaller than the predetermined value. With the motor 6 rotating, the driver's seat is monitored. If the driver is absent for a period of time longer than the predetermined value, the supply of power to the motor 6 is terminated. It should be noted, however, that the rotation of the motor 6 is continued in response to a request for driving continuation.

Figure 9:
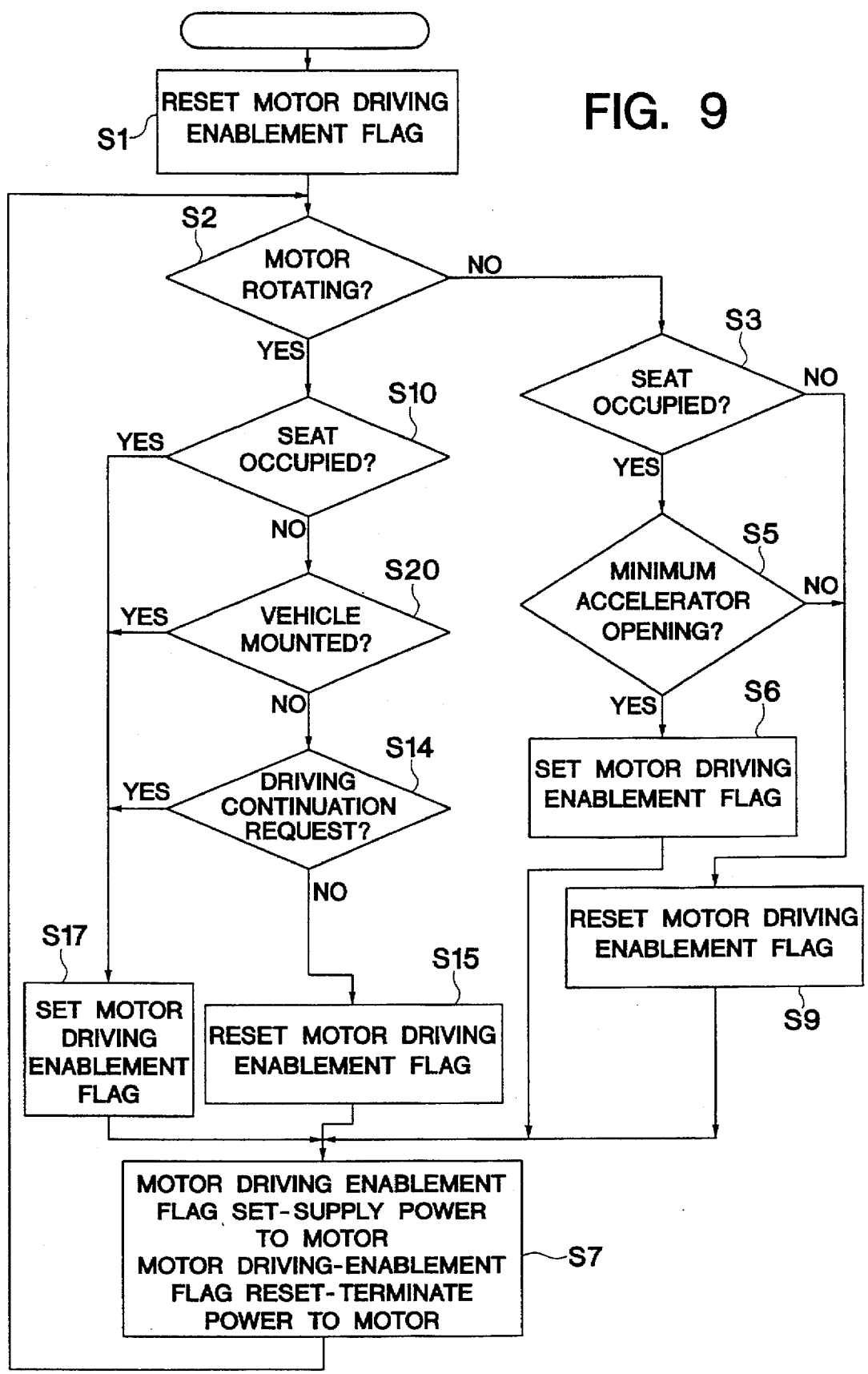
FIG. 9 is a flowchart showing the operation of the control apparatus according to a further embodiment of the present invention.

A flowchart indicating the operation of the control apparatus for electric vehicles according to the FIG. 2 embodiment of the present invention is shown in FIG. 9.

The same step numbers as those shown in FIG. 8 are used in FIG. 9 to indicate identical processing. Here, only differences from the flowchart shown in FIG. 8 are explained.

As shown in the figure, when starting the motor 6, processing for checking states are carried out at steps S3 and S5 If the flow goes to step S6, the motor driving enablement flag is set. Once the motor 6 has entered a rotating state, the control apparatus determines whether or not the driver has occupied the seat at step S10. If the driver is found at the step S10 not to have occupied the seat, the flow continues to a step S20 to determine if the driver has mounted the electric vehicle by examining the detection signal 22a output by the mounting detector 22 which is typically implemented by means of floor switches or the like.

If the driver is found at the step S20 not to have mounted the electric vehicle, the flow continues to a step S14 to determine whether or not a request for driving continuation exists. If no request for driving continuation is found at the step S14, the flow continues to a step S15 at which the motor driving enablement flag is reset. With the motor driving enablement flag reset, the supply of power to the motor 6 is terminated at the following step S7.

With the control apparatus for an electric vehicle according to this embodiment, the motor 6 can be halted immediately when the driver has neither occupied the seat nor mounted the electric vehicle as described above.

Figure 10:
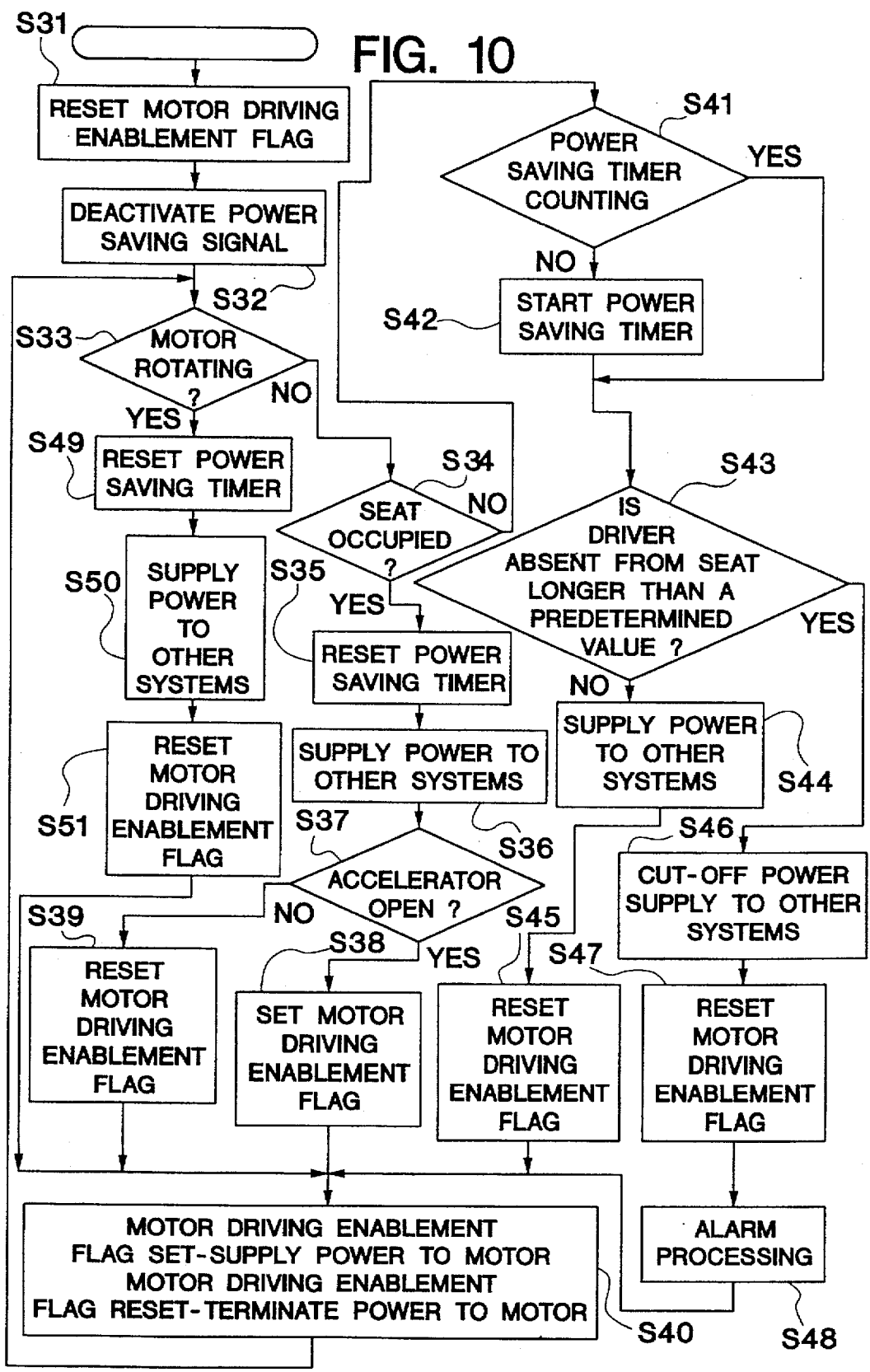
FIG. 10 is a flowchart indicating the operation of the control apparatus according to a still further embodiment of the present invention.

A flowchart indicating the operation of the control apparatus for an electric vehicle according to the FIG. 3 embodiment of the present invention is shown in FIG. 10.

As shown in the figure, the CPU 90 employed in the control apparatus 91 resets the motor driving enablement flag at a step S31 to put the motor 6 in a standstill state and then deactivates the power saving signal 90e at step S32 allowing power to be supplied to other systems such as indicator lamps as soon as the power supply switch is turned on.

The flow then goes to the following step S33 to determine whether the motor 6 is rotating or in a standstill state. If the motor 6 is found standstill at the step S33, the flow continues to a step S34 to examine the seat detection signal 2a. If the driver is found at the step S34 to have occupied the seat, the flow continues to a step S35 at which the power saving timer is reset. At a subsequent step S36, the supply of power to other systems is permitted. The flow then goes to a step S37 to examine the accelerator opening. If the accelerator opening is found equal to a minimum or smaller than a predetermined value at the step S37, the flow continues to a step S38 at which the motor driving enablement flag is set. If the accelerator is found already opened at the step S37, on the other hand, the flow goes to a step S39 at which the motor driving enablement flag is reset.

In either case, the flow continues to step S40 at which the motor driving enablement flag is examined. If the motor driving enablement flag is found set, power is supplied to the motor 6 to rotate it. If the motor driving enablement flag is found reset, on the other hand, the supply of power to the motor 6 is cut off.

If the driver is found at the step S34 not to have occupied the seat, on the other hand, the flow continues to a step S41 to determine whether or not the power saving timer is already counting. If the power saving timer is found not counting at the step S41, the flow continues to a step S42 before going to a step S43. At the step S42, the power saving timer is started. If the power saving timer is found counting at the step S41, on the other hand, the flow goes directly to the step S43 to determine whether or not the driver has not occupied the seat continuously for a period of time longer than a value set in advance. If the time of the absent driver state is found at the step S43 to be shorter in length than the predetermined value, the flow continues to a step S44 at which the supply of power to other systems is allowed until the predetermined time is reached. At the following step S45, the motor driving enablement flag is reset. The driving of the motor 6 with the driver not occupying a seat is thereby terminated.

If the driver is found absent from his seat at the step S43 continuously for a period of time longer than a predetermined value, on the other hand, the flow continues to a step S46 at which a power saving command 90e is issued, cutting off the supply of power to other systems such as lamps and indicators. At a subsequent step S47, the motor driving enablement flag is reset.

At the following step S48, alarm processing is carried out to check whether or not the seat detection signal 2a and the accelerator opening detection signal 3a change. If changes are detected at the step S48, an alarm signal 90f shown in FIG. 6 is activated, causing the alarm sound generating circuit 99 to generate an alarm sound.

If the motor 6 is found rotating at the step S33, on the other hand, the flow continues to step S49 at which the power saving timer is reset. At a subsequent step S50, the supply of power to other systems is enabled and at the following step S51, the motor driving enablement flag is set. Accordingly, the rotation of the motor 6 and the supply of power to the other systems are continued.

In the configuration described above, a power saving command 90e is thus issued, leading to a power saving state in which the supply of power to the other systems is cut off whenever the driver is absent from the electric vehicle continuously for a period of time longer than a predetermined value with the power supply switch turned on. In addition, when the driver occupies a seat or the accelerator is operated in this power saving state, the alarm sound is generated to prompt the driver to pay attention to the fact that the power supply switch is turned on.

FIG. 11 is an overall side view of another embodiment of an electric motor bicycle V equipped with a control unit with a configuration including a microcomputer.

As shown in the figure, the configuration of a vehicle body frame F of the electric motor bicycle V comprises a front frame F1, a middle frame F2 and a rear frame F3 linked to each other. A front fork 104 is attached to a head pipe 101 supporting a driving direction handle 102 for driving the direction of a front wheel Wf through the front fork 104. A battery box 110 is provided at the lower portion of the middle frame F2. The battery box 110 is used for accommodating three batteries on the left side and three batteries on the right side.

The front end of a power unit P housing a driving motor 6 is attached to a pivot axis 105 in such a way that the power unit P can pivot freely up and down. The pivot axis 105 is installed between a pair of installation pipes 201L and 201R which are hung to the rear frame F3. The rear end of the power unit P supports a rear wheel Wr.

A reference numeral 107 is a stand. A side stand switch which is not shown in the figure is installed in close proximity to the stand 107. The side stand switch is used for monitoring the accommodation state of the stand 107.

A large size storage container 109 is installed below a seat 108. An electric charger 112, a travelling control unit 111 and a battery cooling fan not shown in the figure are installed on the lower portion of the large size storage container 109.

A dc/dc converter 202 is attached to the rear of the electric charger 112. The seat detector 2 is installed beneath the seat 108 for verifying that the driver has taken a seat.

A fuse box 203 is mounted on the battery box 110. Reference numeral 204 is a normally closed cover that is opened when replacing a fuse in the fuse box 203. Electrical connection among the travelling control unit 111, the electric charger 112, the dc/dc converter 202, the fuse box 203, the battery 7 and other components is implemented by a wire assembly 205 which is attached to the vehicle body along the frame F.

The outer wall of the head pipe 101 and the front outer wall of the middle frame F2 are covered by a front cover assembly 206. The upper portion of the battery box 110 is used as a step floor. The outer wall of the battery box 110 is covered by a battery cover assembly 207. The rear portion of the vehicle body is covered by a rear cover assembly 208. The seat 108 and a number plate installation unit 209 are attached to the upper and rear portions of the rear cover assembly 208 respectively.

Reference numeral 211 is a battery fixing band. Reference numeral 212 is a battery cooling fan for supplying cooling air to the battery 7 through the middle frame F2. Reference numeral 213 is a rear fender.

It should be noted that a gate shaped bracket 215 is installed between the rear portion of the seat 108 and the rear frame F3. The front end of a rear carrier 216 is fixed to the gate shaped bracket 215 by a bolt. The seat detector 2 is installed on the front portion of the gate shaped bracket 215. In the rear portion of the gate shaped bracket 215, electric charging cords 217 are installed densely. Additional explanation of this part with reference to an enlarged diagram is given as follows.

Figure 12:
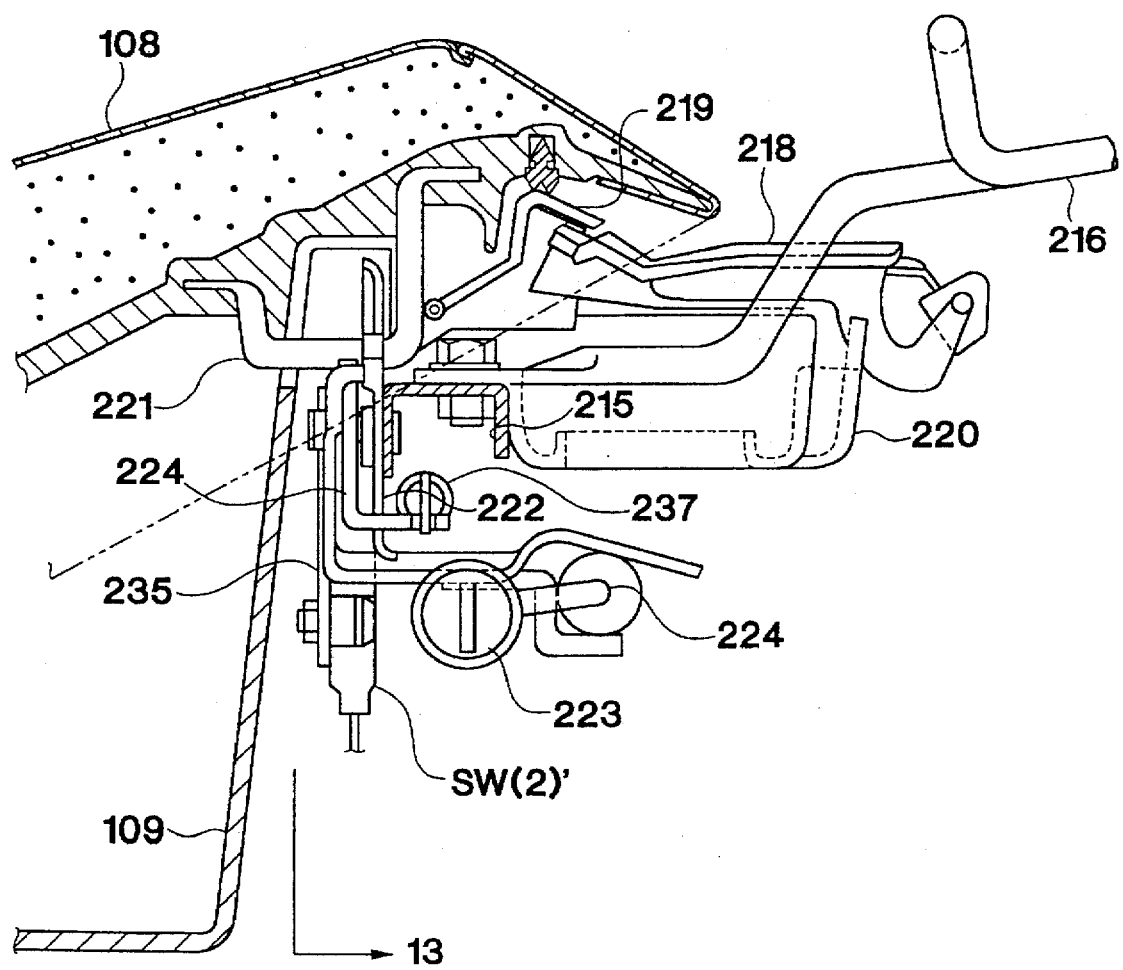
FIG. 12 is an enlarged diagram of the rear portion of a seat shown in FIG. 11.

FIG. 12 is an enlarged diagram of the rear portion of the seat 108 shown in FIG. 11. A bent bar or a bent pipe 221 is attached to the rear portion of the lower surface of the seat 108 which covers an upper opening of the large size storage container 109. A seat switch SW serving as the seat detector 2 is attached to lower portion of the bent bar 221. The seat switch SW is fixed by a bolt to the gate shaped bracket 215 through a plate 222. The plate 222 is referred to hereafter as a switch installing plate. The switch installing plate 222 will be described in detail later.

Reference numerals 218 and 219 shown in the figure are a removal cover and a pressing cover respectively of the electric charging cords 217 shown in FIG. 11. The electric charging cords 217 can be pulled out by opening the seat 108 and then by opening the pressing cover 219 before opening the removal cover 218. Reference numeral 220 is a plug receptacle for holding an end plug of the electric charging cords 217.

Reference numeral 223 is a key cylinder. Reference numeral 224 is a lever linked to the key cylinder 223. When the key cylinder 223 is rotated, the lever 224 is raised, allowing the seat 108 to be opened. Details of the operation are described as follows.

Figure 13:
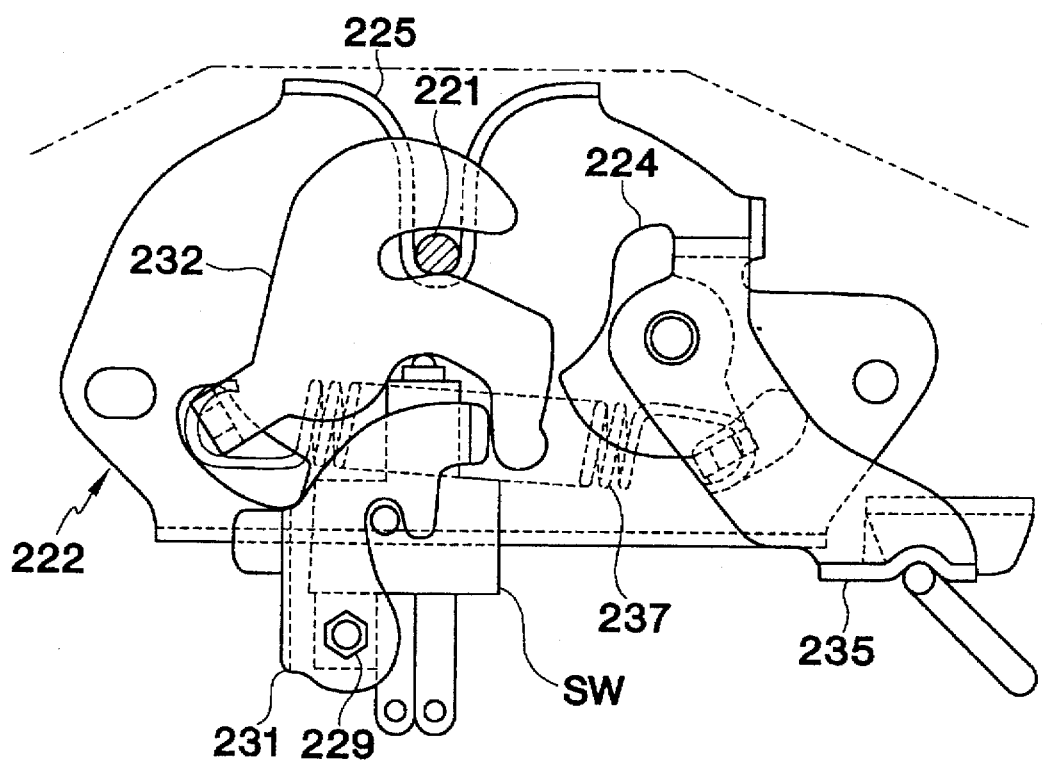
FIG. 13 is a cross section of the rear portion of the seat shown in FIG. 12 indicated by an arrow 13.
Figure 14:
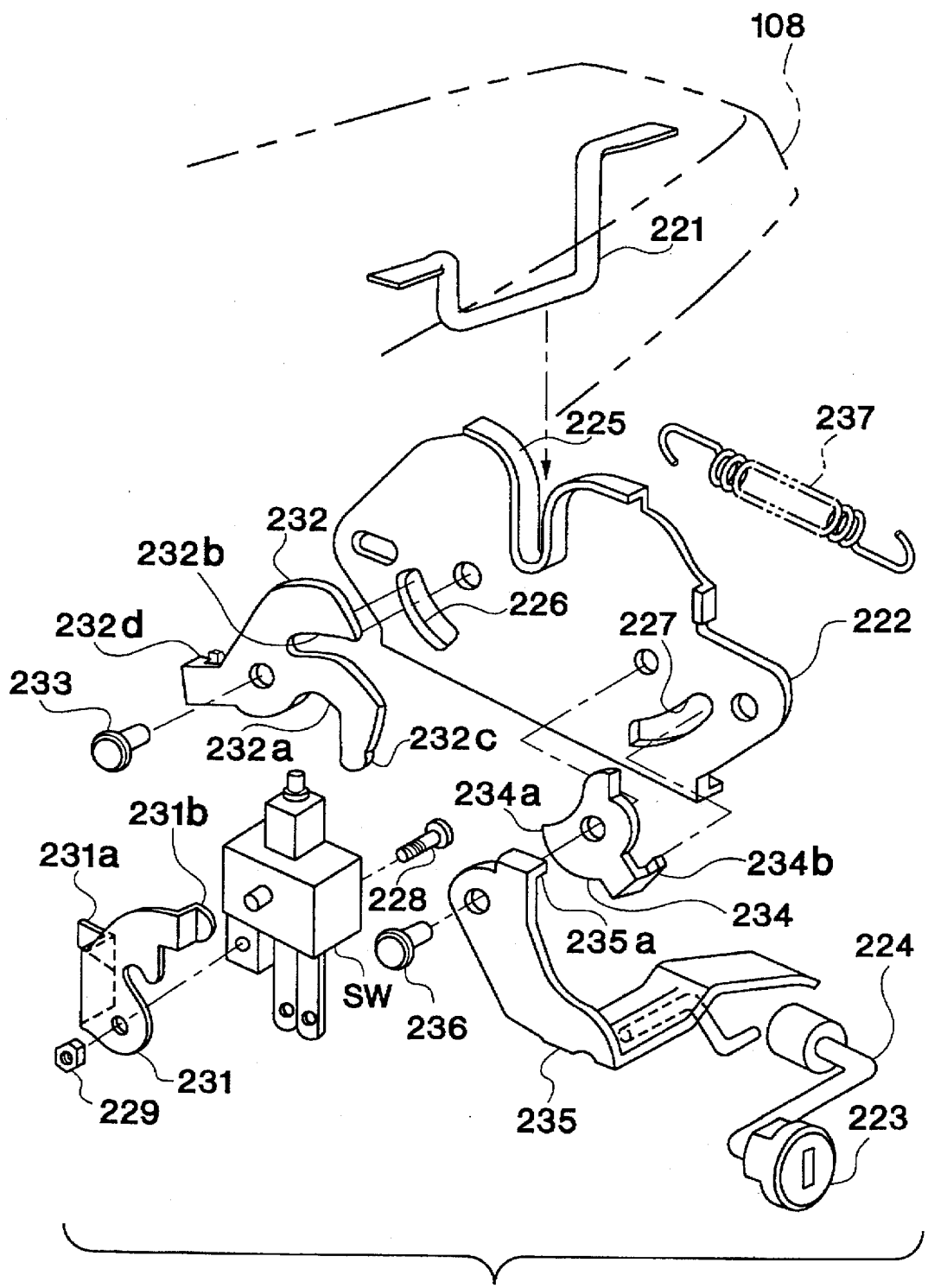
FIG. 14 is an enlarged view of disassembled parts shown in FIG. 13.

FIG. 13 is a cross section of the rear portion of the seat 108 shown in FIG. 12 indicated by an arrow 13. FIG. 14 is a detailed view of disassembled parts of FIG. 13.

As shown in FIG. 14, a guide groove 225 for guiding the bent bar 221 is created on the upper portion of the switch installing plate 222. The lower portion of the switch installing plate 222 is made of a substance having circular arc holes 226 and 227 on the left and right sides.

The seat switch SW is fastened to a small bracket 231 by a bolt 228 and a nut 229. The left and right ends 231a and 231b of the small bracket 231 are welded to the front surface of the switch installing plate 222. In this way, the seat switch SW is attached to the center lower portion of the switch installing plate 222.

A first fluctuation plate 232 is installed on the switch installing plate 222 using a rivet 233 in such a way that the first fluctuation plate 232 can fluctuate. The first fluctuation plate 232 is equipped with a switch contact unit 232a which is in contact with the seat switch SW, a seat lock groove 232b engaged to the bent bar 221 for locking the seat 108, an arm unit 232c and a spring peg unit 232d.

In addition, a second fluctuation plate 234 and a fluctuation lever 235 are installed on the switch installing plate 222 using a rivet in such a way that the second fluctuation plate 234 and the fluctuation lever 235 can fluctuate. The second fluctuation plate 234 is equipped with a seat lock cam 234a and a spring peg unit 234b. The fluctuation lever 235 has a bent portion 235a and is extended to the lever 224 mentioned earlier. For the sake of convenience, the second fluctuation plate 234 and the fluctuation lever 235 are shown in FIG. 14 as separated entities. In actuality, however, they are welded to each other to form a single body.

A spring 237 is installed between the spring peg unit 232d of the first fluctuation plate 232 and the spring peg unit 234b of the fluctuation plate 234. It should be noted that the spring peg units 232d and 234b pass through the circular arc holes 226 and 227 respectively.

FIG. 13 shows an assembly posture. It should be noted, however, that the assembly order described above can be changed.

Figure 15:
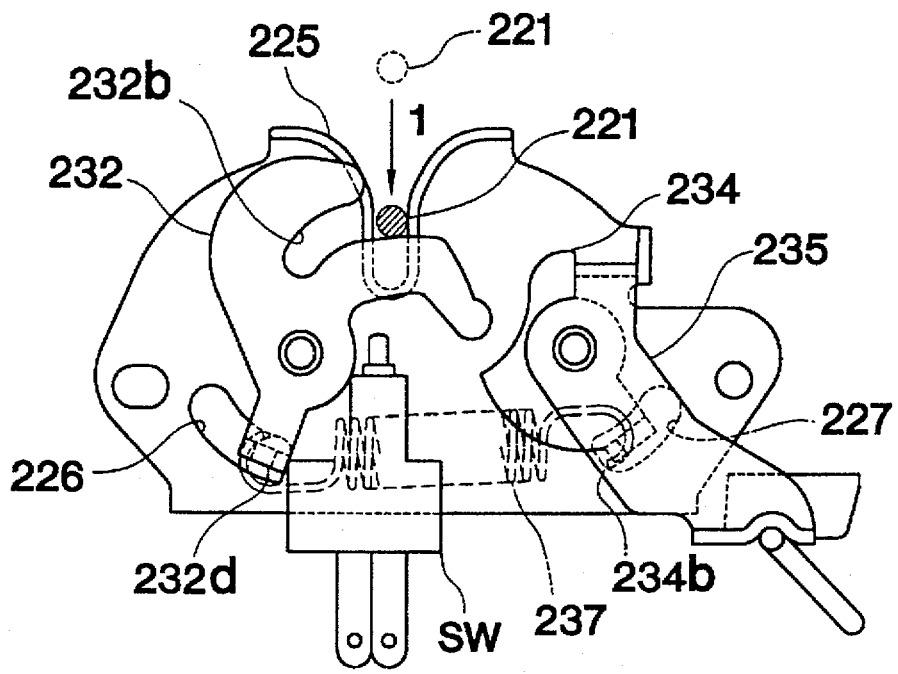
FIGS. 15(a) and 15(b) are explanatory diagrams used for describing the first half effect of the seat lock operation and the seat switch SW.
Figure 15:
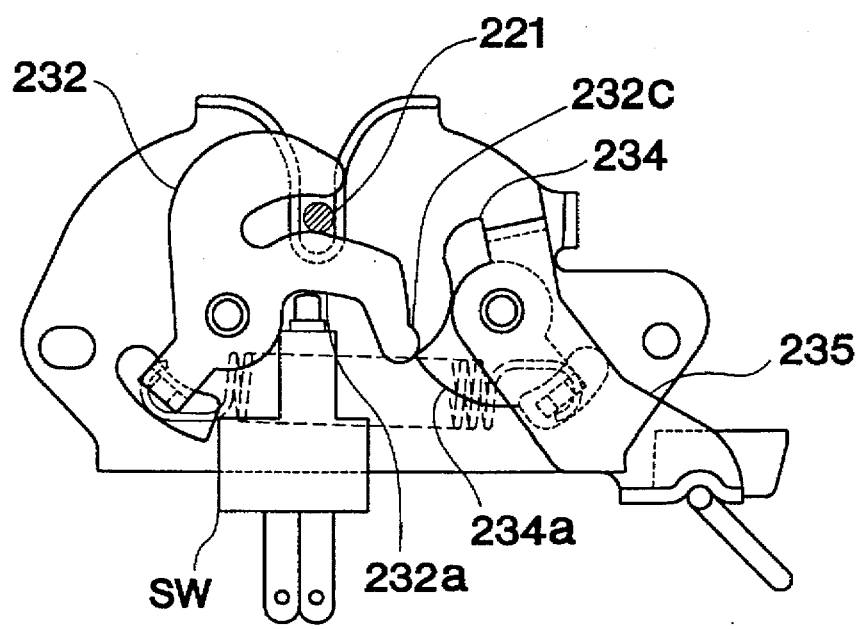
Figure 16:
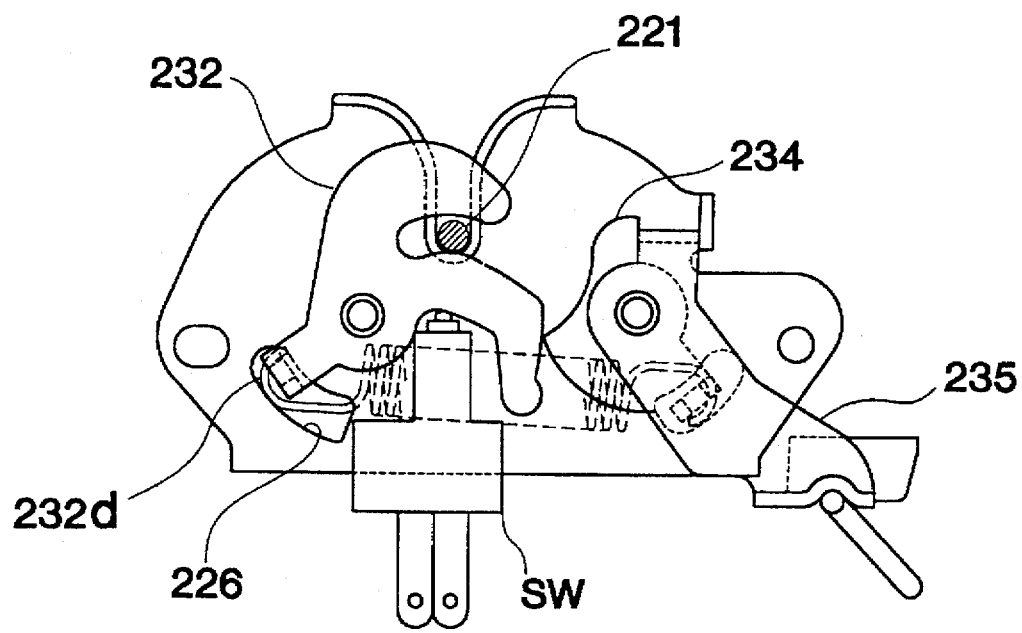
FIGS. 16(a) and 16(b) are explanatory diagrams used for describing the second half effect of the seat lock operation and the seat switch SW.
Figure 16:
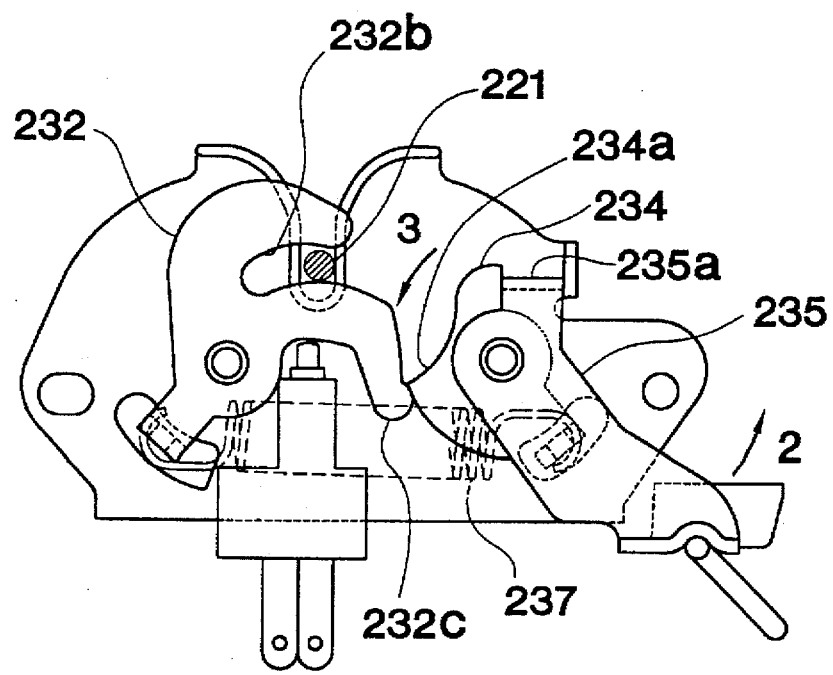

FIGS. 15 (b) and (a) are explanatory diagrams used for describing the first half effect of a seat lock operation and the seat switch SW respectively. FIGS. 16 (b) and (a) are explanatory diagrams used for describing the second half effect of the seat lock operation and the seat switch SW respectively.

FIG. 15 (a) shows an effect that results when the opened seat is restored to the seated position. With the bent bar 221 positioned on an imaginary line, an attracting force of the spring 237 causes the first fluctuation plate 232 to rotate in the counterclockwise direction. However, the rotation of the first fluctuation plate 232 is stopped by the spring peg unit 232d hitting one end of the circular arc groove 226.

In addition, the attracting force of the spring 237 causes the second fluctuation plate 234 and the fluctuation lever 235 to rotate in the clockwise direction. It should be noted that, in the following description, the second fluctuation plate 234 and the fluctuation lever 235 are referred to simply as the second fluctuation plate 234. However, the rotation of the second fluctuation plate 234 is stopped by the spring peg unit 234b hitting one end of the circular arc groove 227.

As indicated by an arrow 1, the bent bar 221 is lowered along with the seat along a path led by the guide groove 225. Being pressed by the bent bar 221, the first fluctuation plate 232 is rotated in the clockwise direction.

FIG. 15 (b) shows the switch contact unit 232a of the first fluctuation plate 232 hitting the seat switch SW in the course of rotation and, at the same time, the arm unit 232c of the first fluctuation plate 232 starting to press the seat lock cam 234a of the second fluctuation plate 234. The second fluctuation plate 234 rotates slightly in the counterclockwise direction.

FIG. 16 (a) shows a state in which the bent bar 221 is further lowered, causing the first fluctuation plate 232 to rotate in the clockwise direction. In this state, the seat switch SW detects the weight of the driver being applied in the downward direction to the seat.

At that time, the first fluctuation plate 232 is rotated in the clockwise direction. However, the rotation of the first fluctuation plate 232 is stopped by the spring peg unit 232d hitting one end of the circular arc groove 226.

FIG. 16 (b) shows a normal parked state in which the driver has departed from the seat. In this state, no weight except the weight of the seat itself is applied.

The force of the spring 237 causes the first fluctuation plate 232 to rotate in the counterclockwise direction, slightly raising the seat through the bent bar 221. As a result, the seat switch SW detects that nobody is sitting on the seat. It should be noted, however, that the rotation in the counterclockwise direction of the first fluctuation plate 232 is stopped because its arm unit 232c is hindered by the seat lock cam 234a of the second fluctuation plate 234. Since the bent bar 221 is engaged to the seat lock groove 232b, its upward and downward movement is restricted, allowing only small play.

The following is description of an effect that results when putting or removing an article such as a helmet into or from the large size storage container 109.

As described above, the normal parked state is shown in FIG. 16 (b). When the key cylinder 223 shown in FIG. 12 is rotated by using a key to raise the lever 224 in the normal parked state, the fluctuation lever 235 shown in FIG. 16 (b) is rotated in the counterclockwise direction as indicated by an arrow 2 and its bent portion 235a rotates the second fluctuation plate 234 in the counterclockwise direction as shown by an arrow 3.

Then, the seat lock cam 234a of the second fluctuation plate 234 is moved from a position above the arm unit 232c of the first fluctuation plate 232 to a position below the arm unit 232c. At this position, the lock effect of the seat lock cam 234a that has been working on the first fluctuation plate 232 so far is eliminated and the first fluctuation plate 232 is rotated over a large angle in the counterclockwise direction by an attracting force of the spring 237. The state at that time is the same as that shown in FIG. 15 (a). Since the bent bar 221 has also been released from the set lock groove 232b of the first fluctuation plate 232, it is possible to open the seat later.

As described above, this embodiment has the seat switch SW, the first and second fluctuation plates 232 and 234, the fluctuation lever 235 and the spring 237 assembled as a single body attached to the switch installing plate 222. Thus, operations to close and open the seat and to verify that the driver has occupied the seat can be accomplished using an integrated assembly of components with a mechanism shown in FIG. 11. As shown in the figure, the mechanism is characterized in that the components thereof can be accommodated as a compact assembly in a very narrow space between the rear portion of the seat 118 and the gate shaped bracket 215.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the control apparatuses of the present invention may be used with electric motor vehicles other than electric motor bicycles.

What is claimed is:

1. A seat detecting apparatus for verifying that a driver of an electric vehicle has occupied a seat of the electric vehicle, the seat detecting apparatus comprising:

a seat lock engagement unit installed on the seat;

seat lock members engaged to said seat lock engagement unit for holding the seat in a closed state, said seat lock members displaceable in a closing direction of the seat when the seat is not occupied by the driver, displacement of said seat lock members being detectable through said seat lock engagement unit when the driver occupies the seat.

\* \* \* \* \*